(12) United States Patent
Chapman

(10) Patent No.: US 9,286,461 B2
(45) Date of Patent: Mar. 15, 2016

(54) MULTIFACE DOCUMENT

(71) Applicant: Bryan P. Chapman, Alderley (AU)

(72) Inventor: Bryan P. Chapman, Alderley (AU)

( * ) Notice: Subject to any disclaimer, the term of this patent is extended or adjusted under 35 U.S.C. 154(b) by 0 days.

(21) Appl. No.: 14/727,033

(22) Filed: Jun. 1, 2015

(65) Prior Publication Data

US 2015/0269375 A1  Sep. 24, 2015

Related U.S. Application Data

(60) Division of application No. 13/732,310, filed on Dec. 31, 2012, now Pat. No. 9,047,713, which is a continuation-in-part of application No. 13/098,321, filed on Apr. 29, 2011, now Pat. No. 8,342,414.

(60) Provisional application No. 61/329,985, filed on Apr. 30, 2010.

(51) Int. Cl.
*G06K 5/00* (2006.01)
*G06F 21/34* (2013.01)
*G07C 9/00* (2006.01)
*G06K 19/04* (2006.01)
*B42D 25/00* (2014.01)
*B42D 25/23* (2014.01)
*G06K 19/077* (2006.01)

(52) U.S. Cl.
CPC ............... *G06F 21/34* (2013.01); *B42D 25/00* (2014.10); *B42D 25/23* (2014.10); *G06K 19/042* (2013.01); *G06K 19/07722* (2013.01); *G06K 19/07749* (2013.01); *G07C 9/00031* (2013.01)

(58) Field of Classification Search
CPC ........ B42D 1/101; B42D 1/104; G06K 19/077
USPC .................. 235/488, 487, 492, 454, 380, 385
See application file for complete search history.

(56) References Cited

U.S. PATENT DOCUMENTS

| 7,370,807 B2 * | 5/2008 | Buursma et al. .............. 235/492 |
| 2009/0019751 A1 * | 1/2009 | Goetting ......................... 40/663 |
| 2009/0039154 A1 * | 2/2009 | Williams et al. ............. 235/380 |

* cited by examiner

*Primary Examiner* — Daniel St Cyr
(74) *Attorney, Agent, or Firm* — Kleinberg & Lerner, LLP; Marvin H. Kleinberg; Marshall A. Lerner

(57) ABSTRACT

A multisided card having at least two obverse faces and two reverse faces that are adjacent one another, can be used to print and store relatively insecure information of the obverse faces and to have more sensitive information stored and printed on the adjacent reverse faces. To protect privacy, a caricature or cartoon of an individual can be placed on an obverse face, or in a virtual card, wallet or purse, which image cannot be read by facial recognition techniques but could be recognized by human observers.

10 Claims, 35 Drawing Sheets

FIG. 21

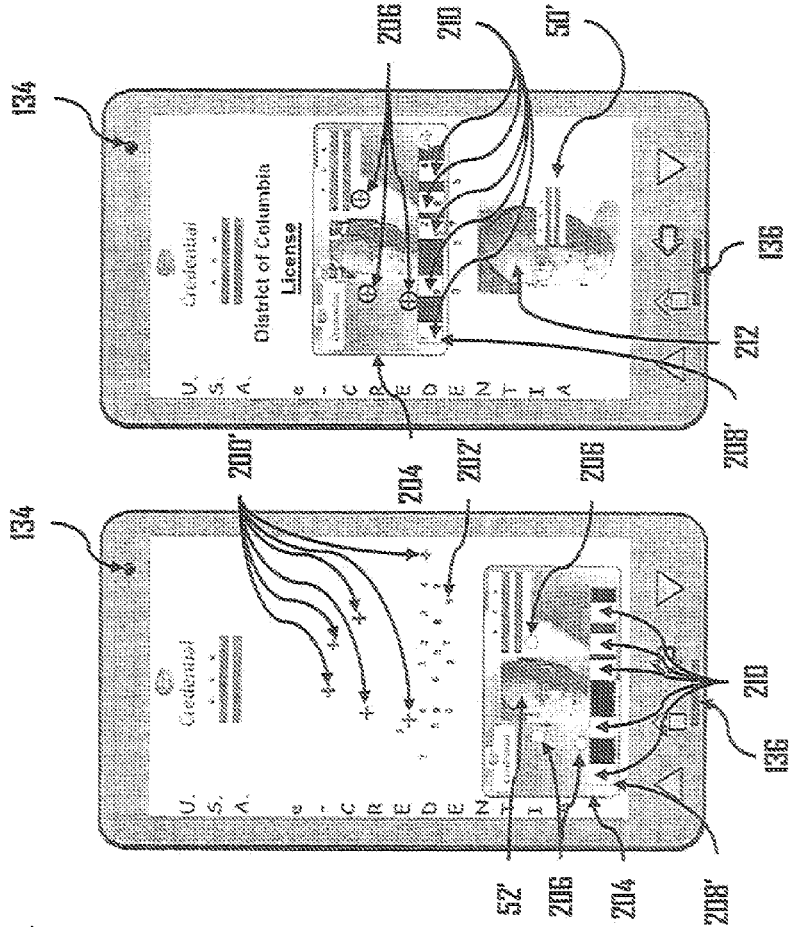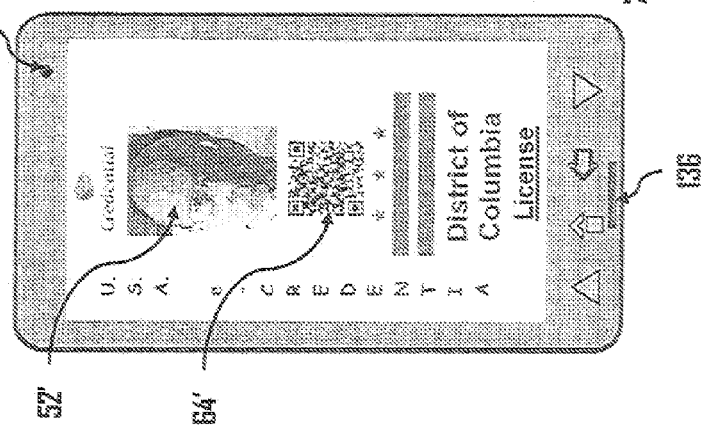
FIG. 23A  FIG. 23B  FIG. 23C

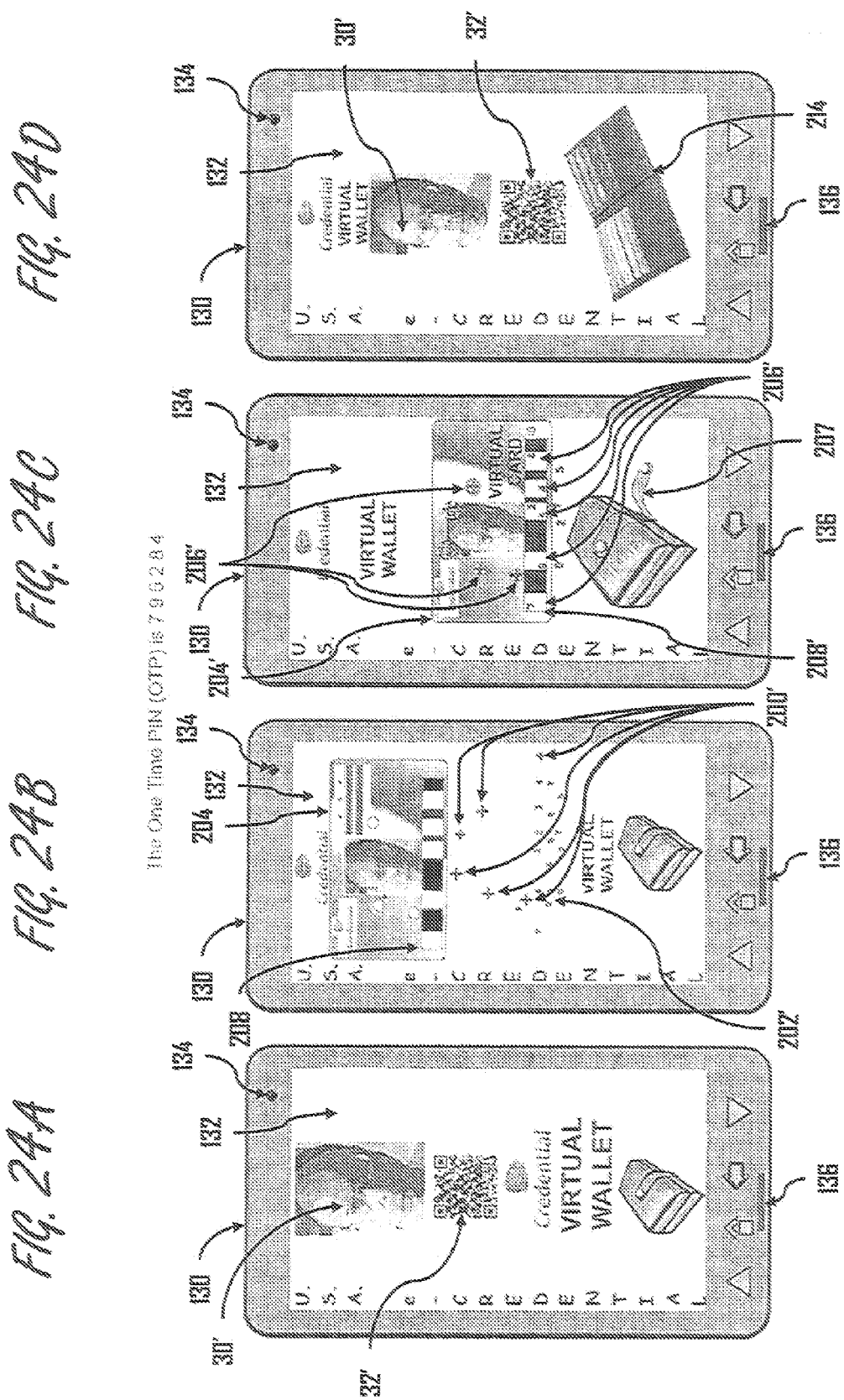

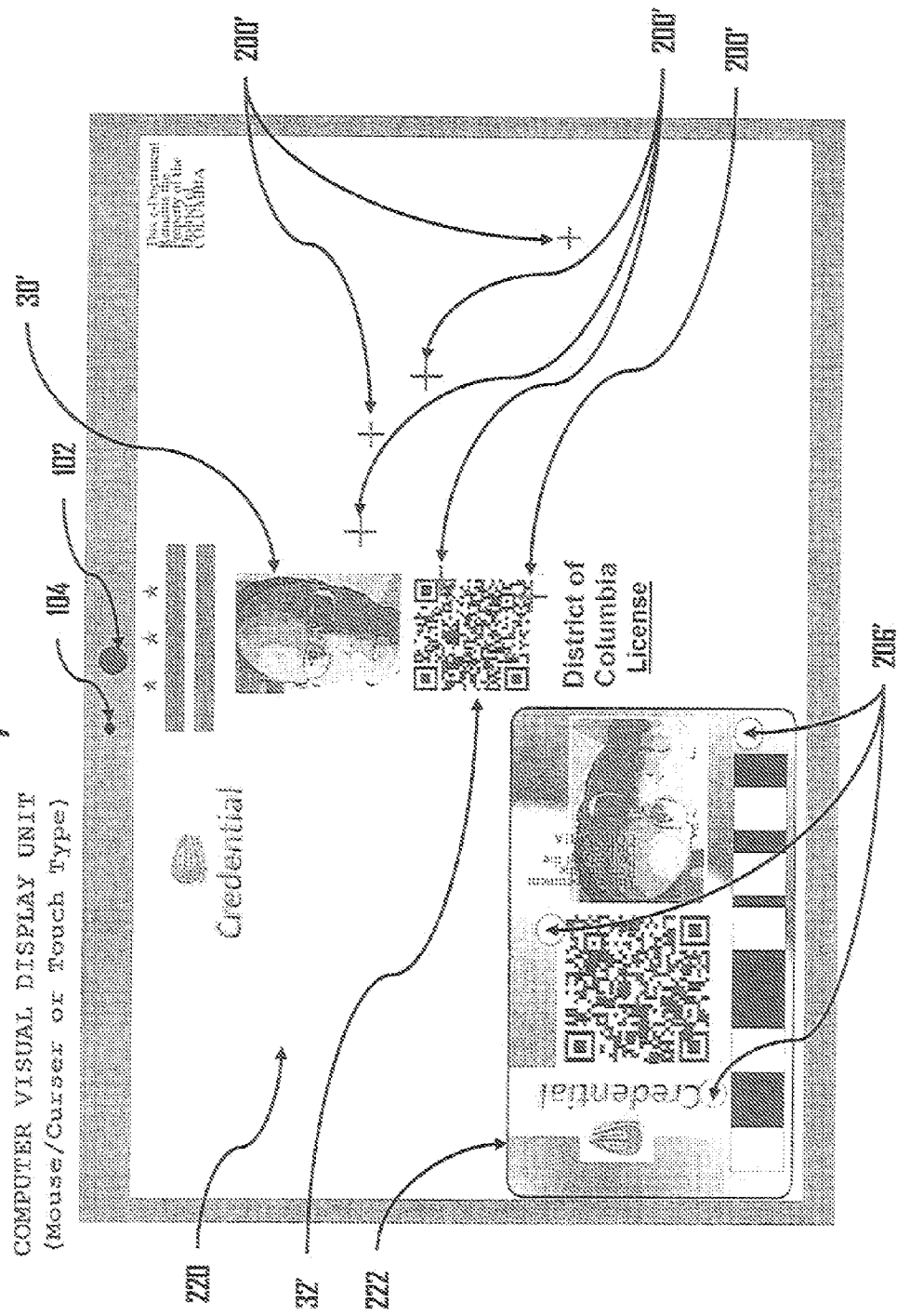

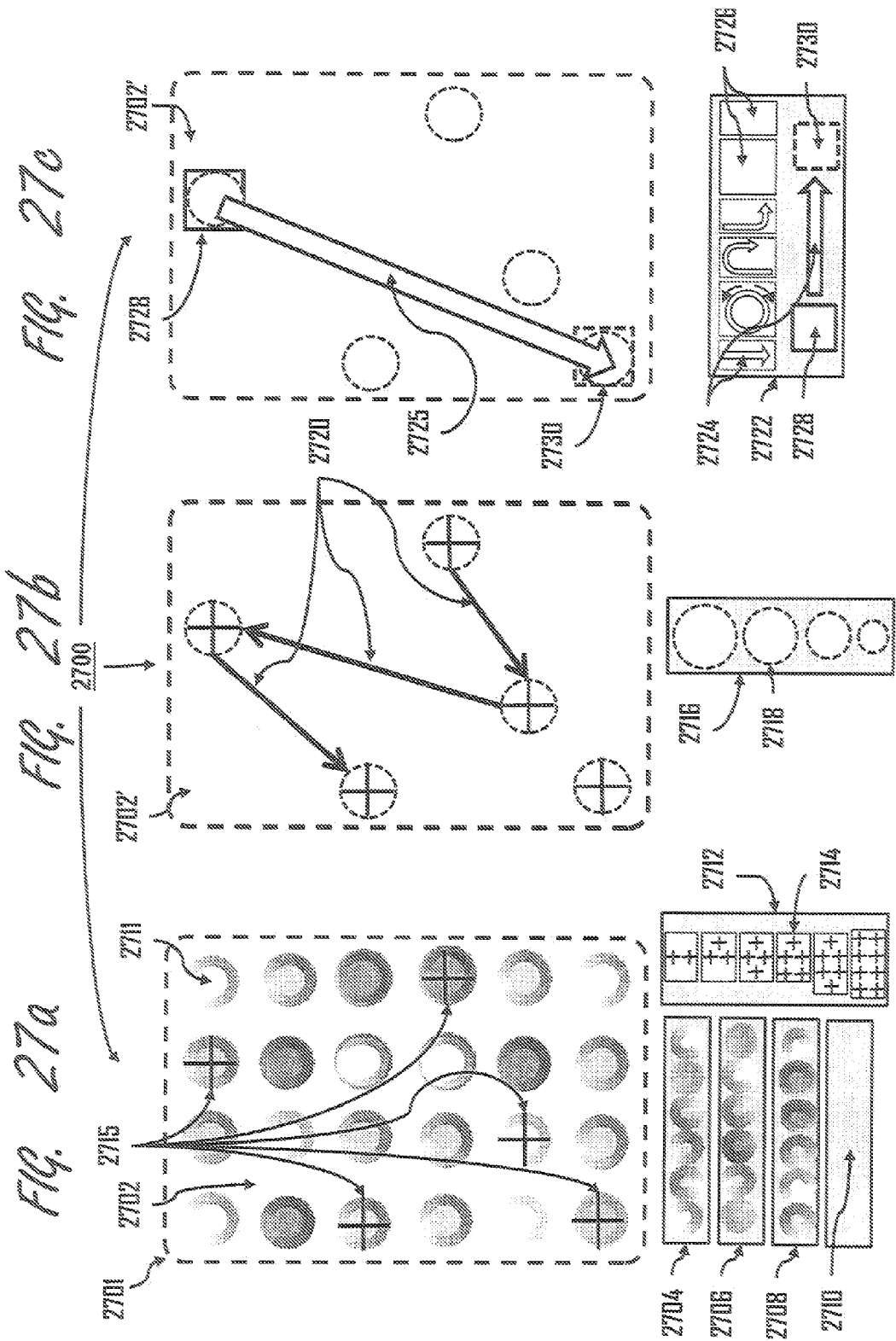

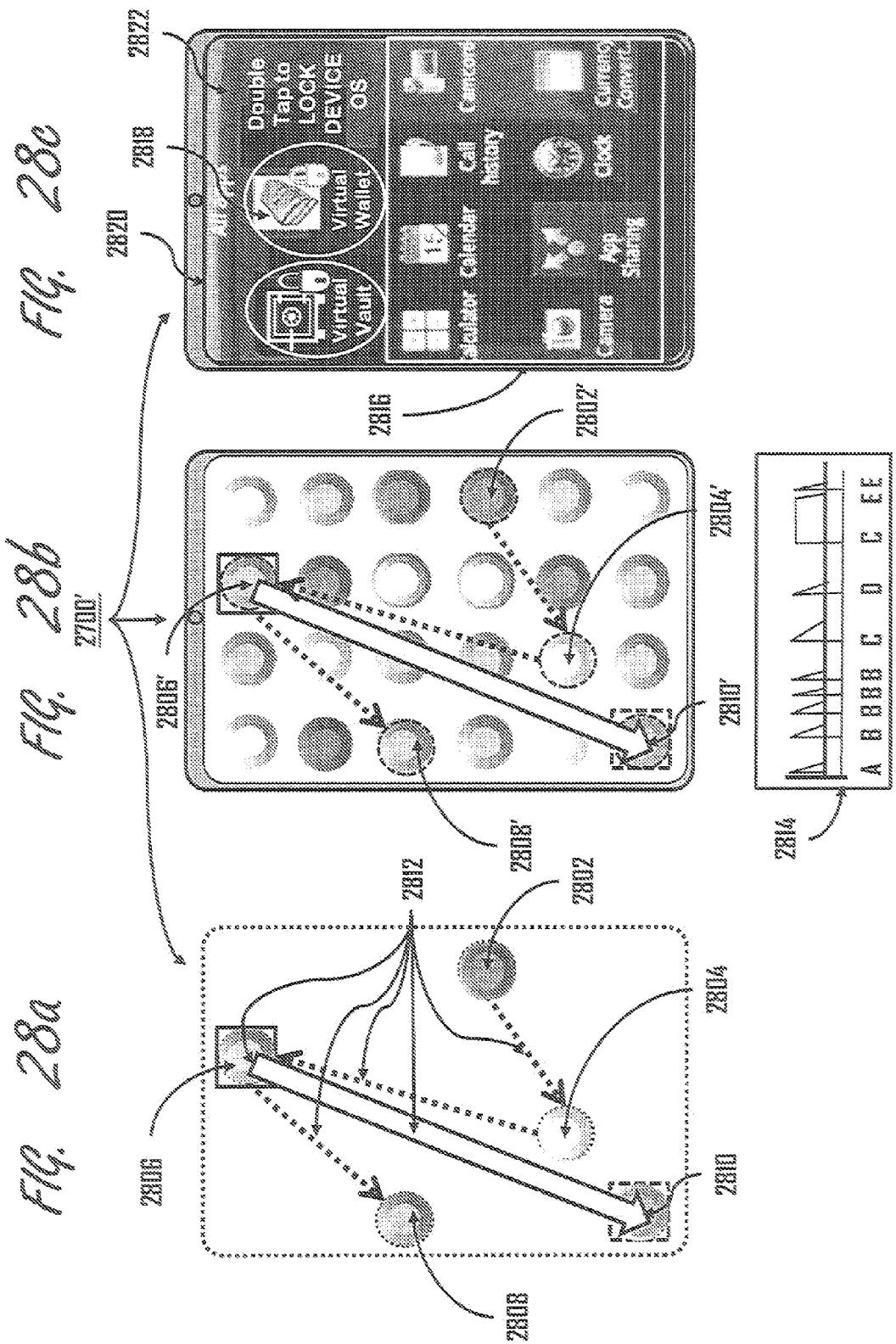

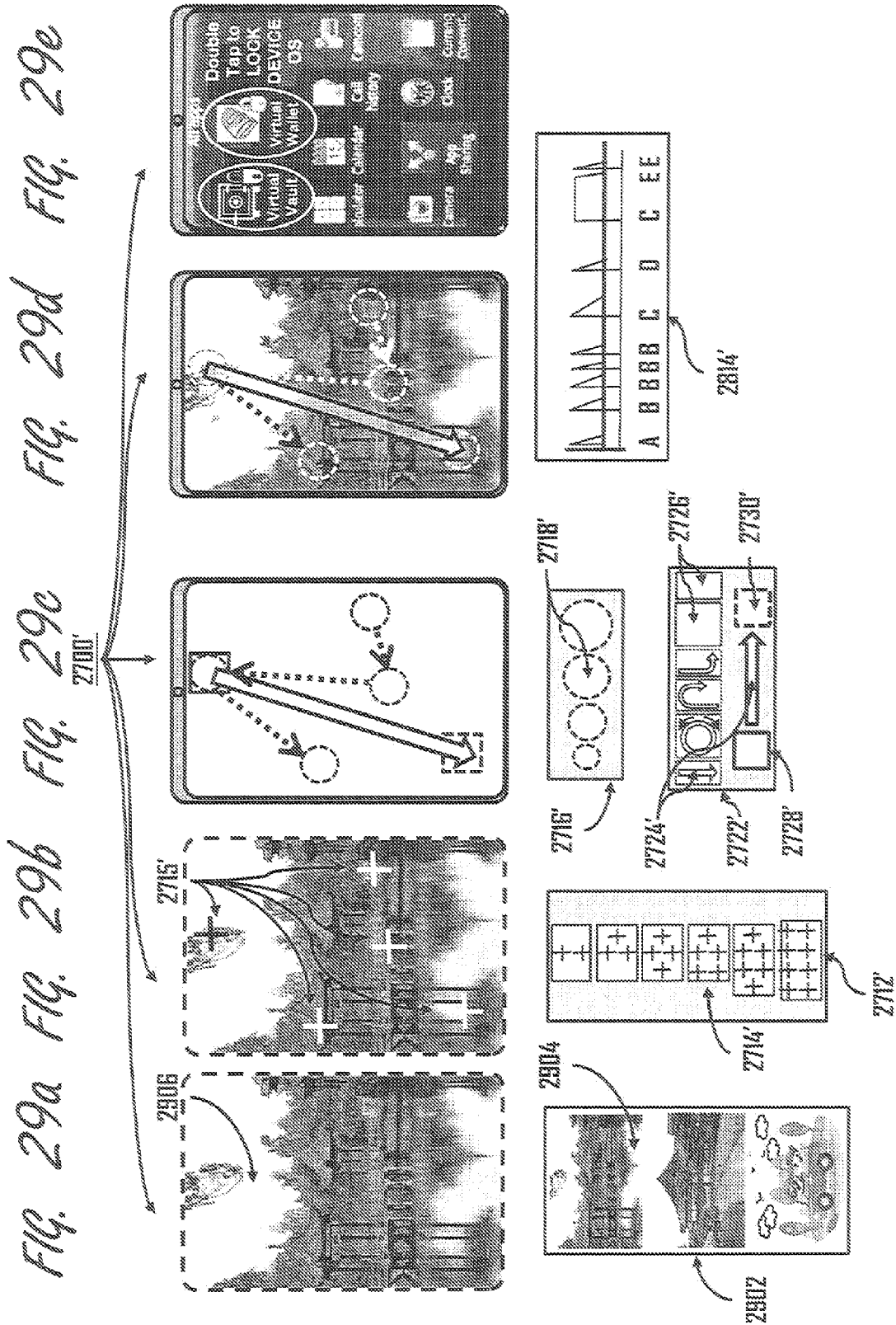

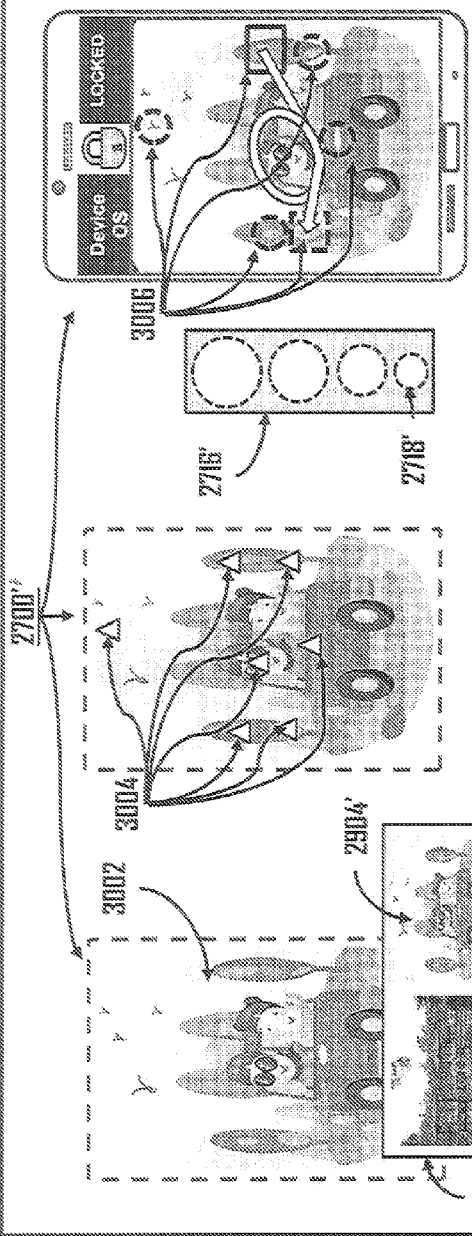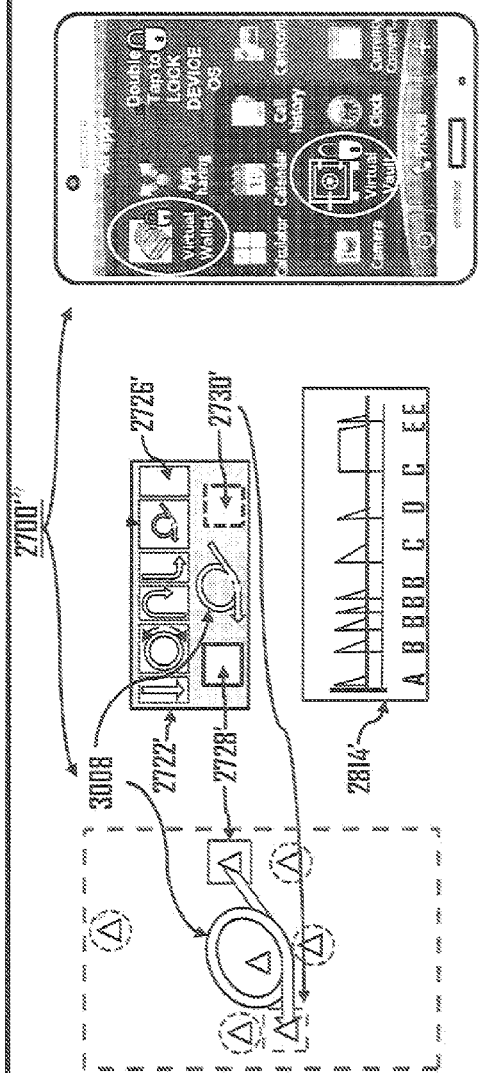

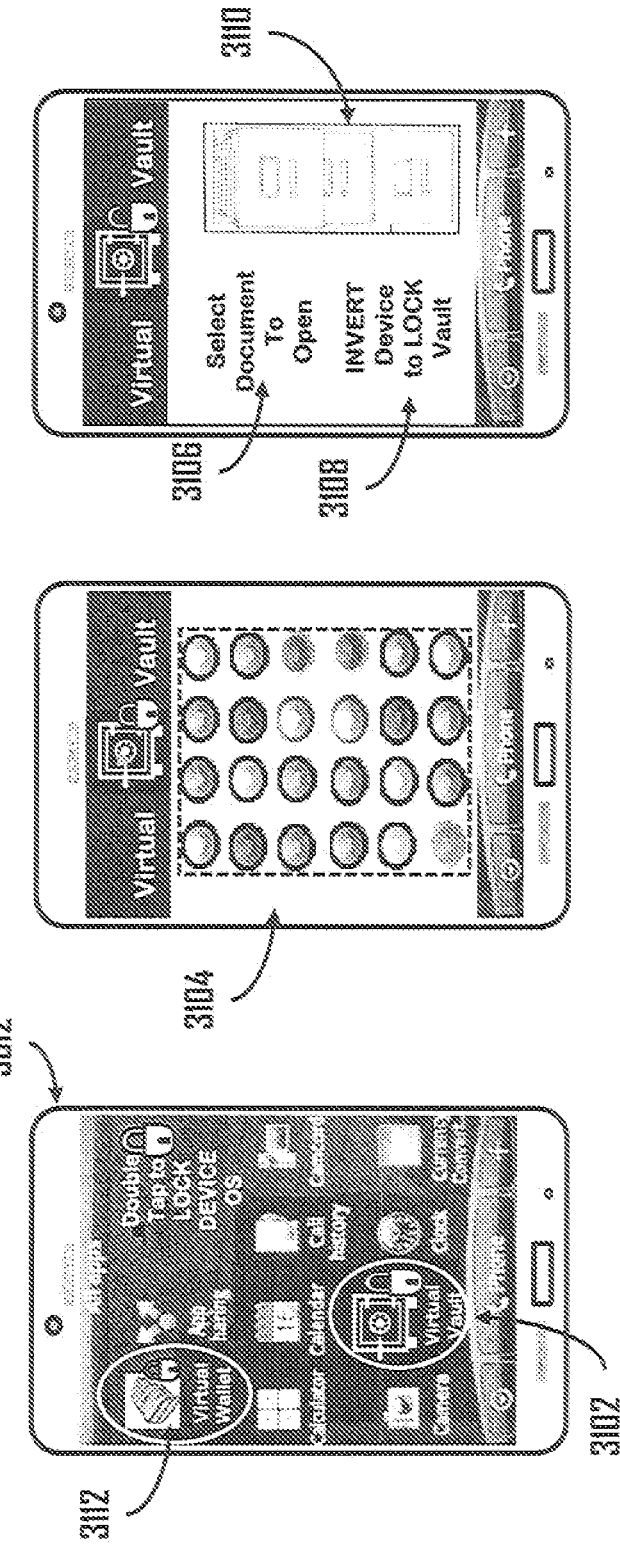

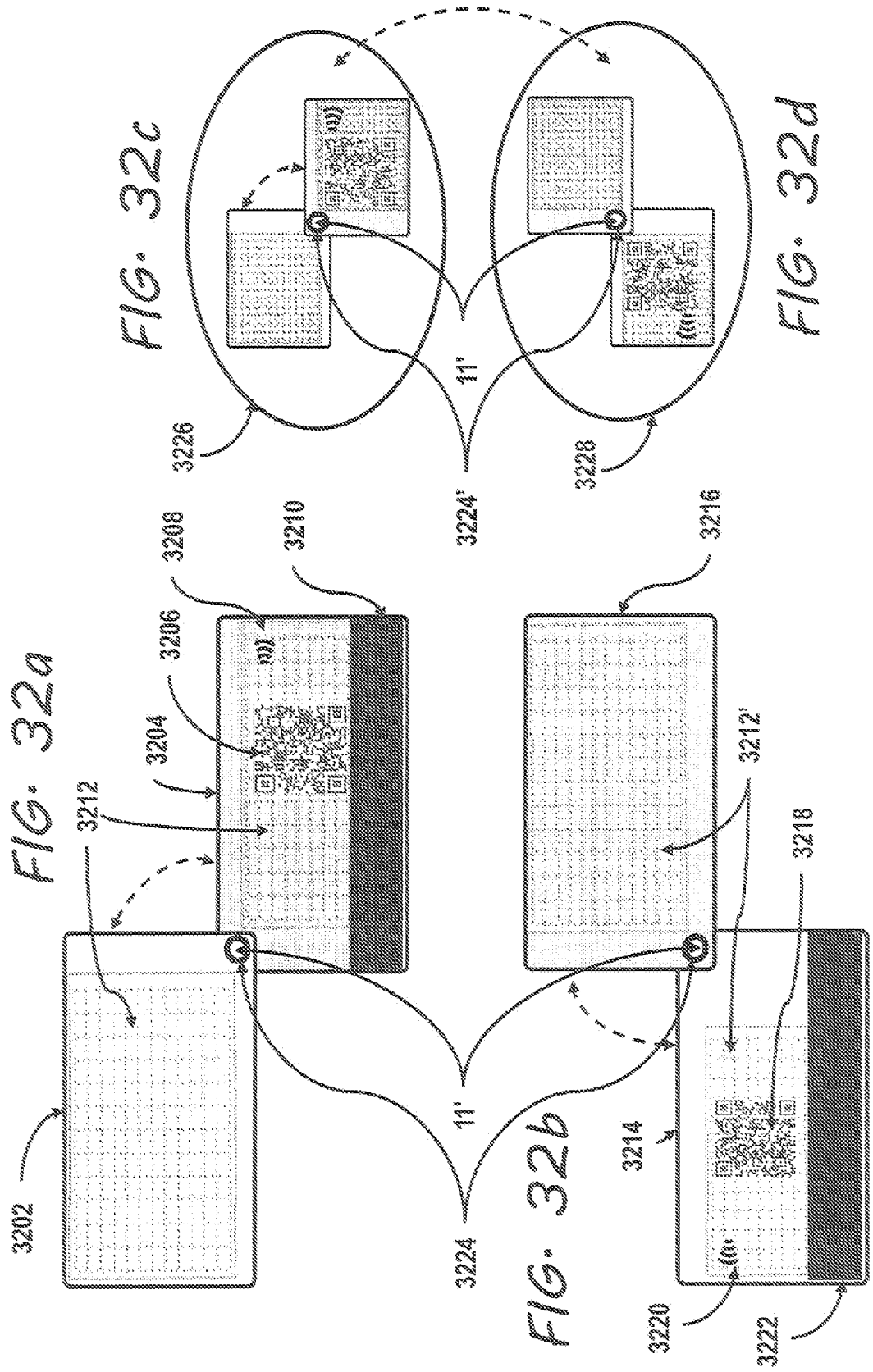

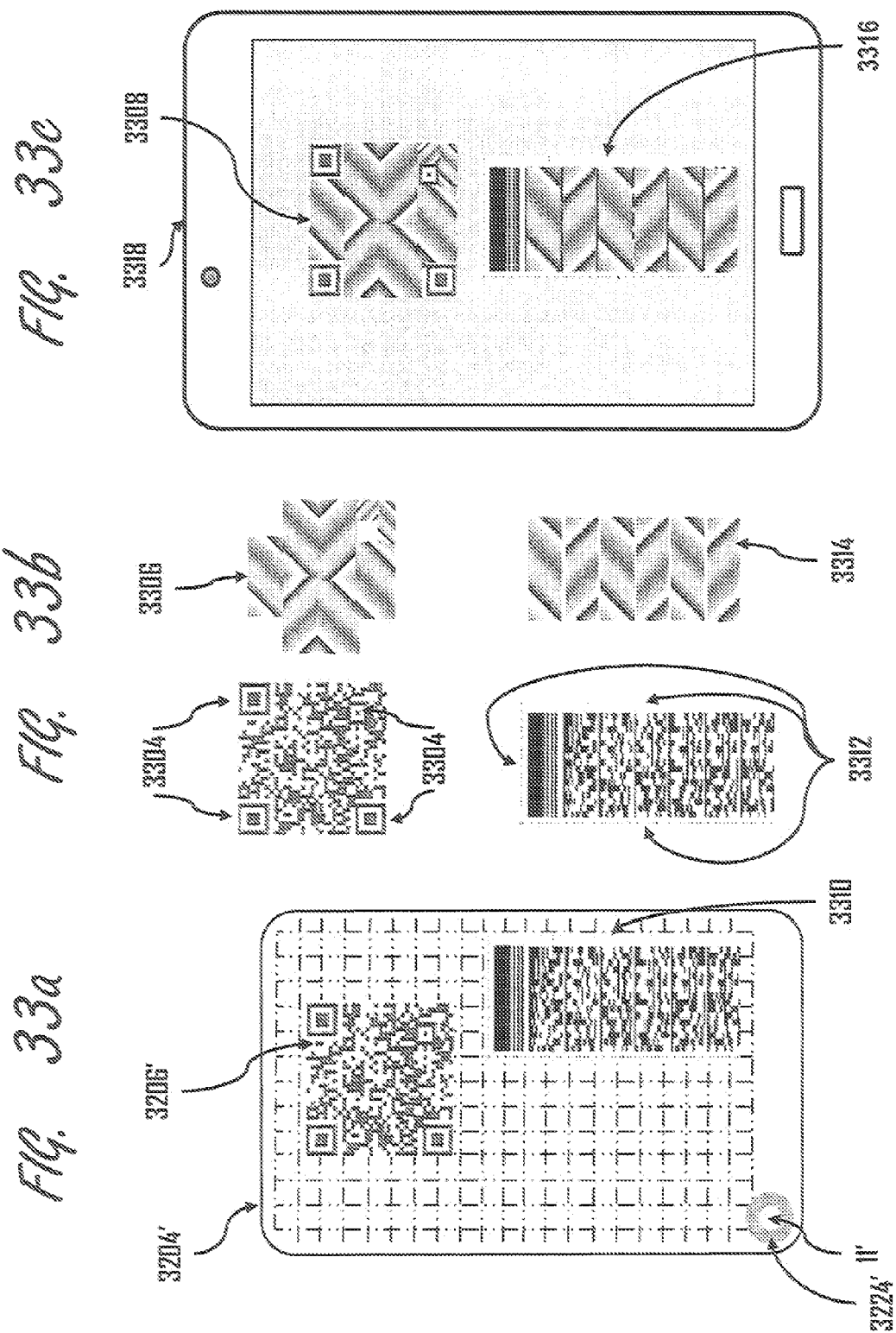

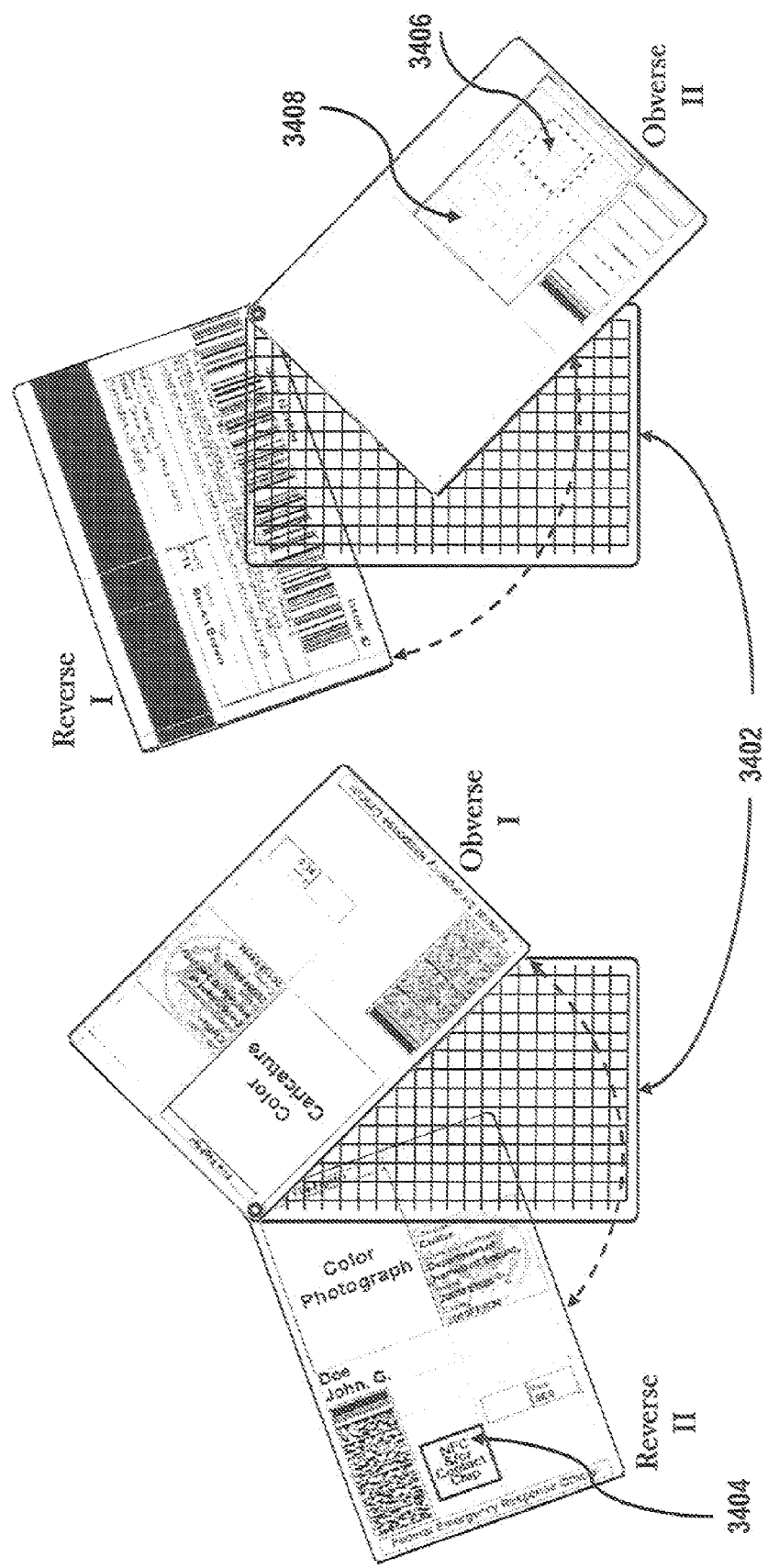

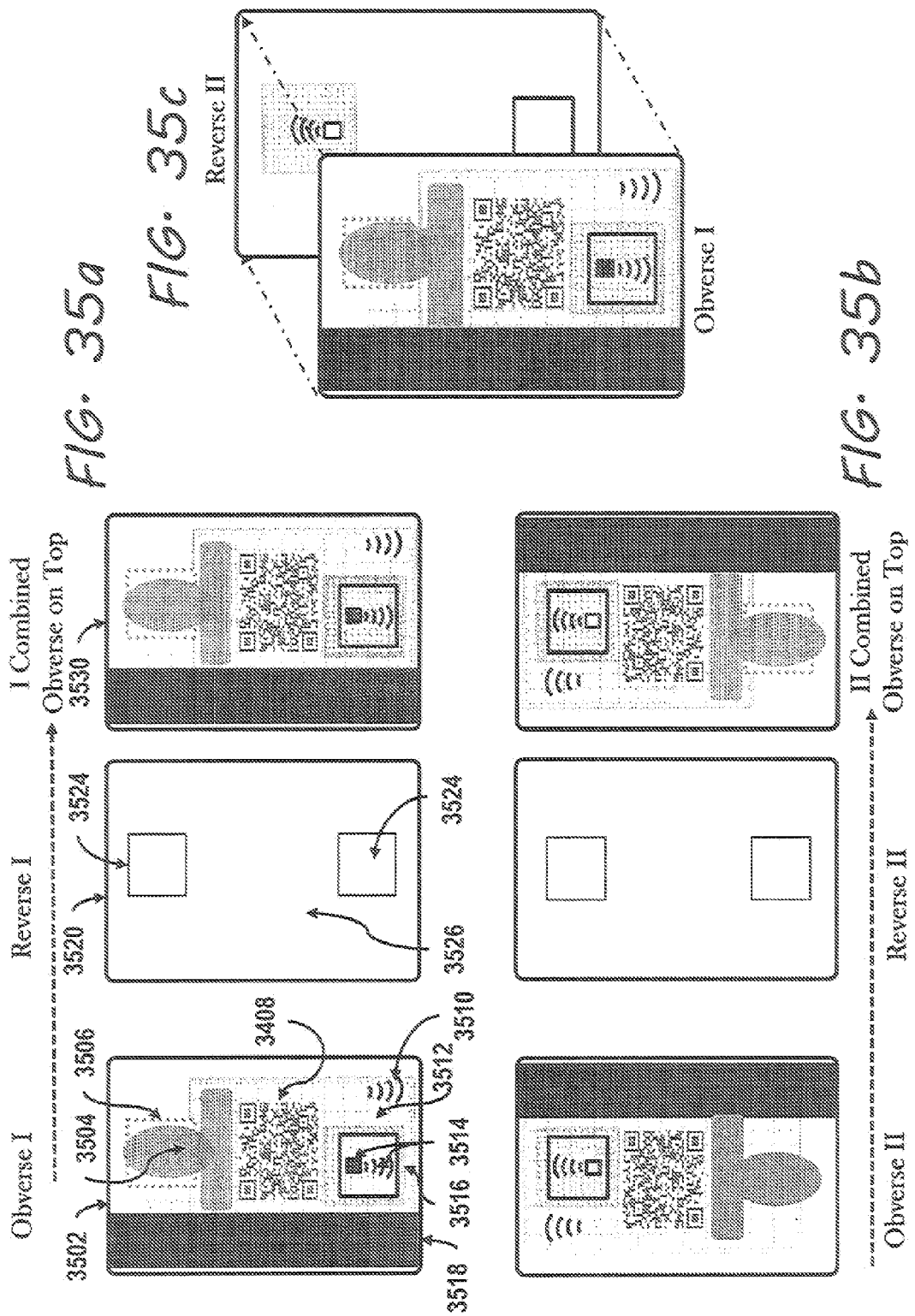

MULTIFACE DOCUMENT

BACKGROUND OF THE INVENTION

1. Field of the Invention

The present invention relates to a combination of real and virtual documents, cards, purses or wallets for identification in the conduct of financial or other transactions and, more particularly, documents or cards that can be used in secure real or virtual financial transactions, for emergency/disaster management, refugee management, emergency medical management or for evacuation or travel both domestic and international, all within a secure and trusted environment that can produce trusted secure multiple layered data in real time in a non stovepipe environment including use in conjunction with Cash dispensing and/or receiving Machines having an Integrated 2/3 D Counter surveillance functions.

2. Description of the Related Art

For many years, identification cards have been provided which have, on an obverse face, pictures, information about the bearer and, on a reverse face, a magnetic strip containing much of the same information. Such cards have been used a driver's licenses, credit or debit cards, and, in recent years as an integral part of a passport document.

Variations of such a card might include embedded codes, matrix codes or optically read information strips. Still other variations might include radio frequency identification circuits ("RFID") which can be embedded in the card body and can be remotely accessed for the information contained therein and used for example as a Near Field Communication or have an embedded contact or radio frequency so called Integrated Circuit Chip (ICC) or Smart Chip. NFC and ICC's contain data and are usually of a read-only type. However, they may be rewriteable, and can be custom-encoded at time of manufacture or issuing in accordance with a interoperable specification. NFC ICC's can allegedly securely store personal data such as financial debit and credit card information, loyalty program data, PINs and network, with other information. The NFC ICC's generally fall into four types of ICC that each provide different communication speeds and capabilities in operation configurability, memory, data retention, write endurance and security. The four ICC types currently offer between 96 and 4,096 bytes of memory.

In like manner to RFID technology, near-field communication uses magnetic induction between two sets of usually loop type antennas located within each other's near field communication range, effectively forming an power air-gap between an reading station and the ICC itself. NFC devices to date operate within the globally available and unlicensed frequency at 13.56 MHz wherein the RF energy is concentrated in the allowed ±7 kHz band range, but the full spectral envelope may be extended to 1.8 MHz should Amplitude-shift keying (ASK) modulation of a carrier wave be employed.

Theoretical working distance with compact standard antennas are presumed to be about 8" with a practical working distance of about 1-1½". There are two types of NFC ICC's;

1) Passive type—where the reading station device provides the electromagnetic carrier field and the non powered NFC ICC within a carrier means or device answers by modulating the existing field. The carrier means or device obtains its operating power from the reading stations electromagnetic field, thus turning the carrier means or device included ICC into a transponder.

2) Active type—where both the reading station and carrier means or device communicate by alternately generating their own respective power field (which in some devices could be contact provided using the same MFC protocol). Wherein the respective RF carrier means or devices' powered ICC RF field is deactivated while it is waiting for a data ping or request from a reading station. When a carrier means or device with a powered ICC contained therein is appropriately pinged, it also is turned into a transponder but in this instance responds using its own power.

A magnetic field probe can be used to recover the private key of an RSA public key encryption algorithm. A second demonstration recovers the key from an ECC algorithm from a distance of approximately 3 m. Both analyses use inexpensive readily available RF receiving equipment for signal collection. Baseband EM approaches are similar to power measurement attacks such as SPA and DPA. EM analyses do not require the same level of physical access to a device that other side channels may require. Compliance with FCC emission thresholds will likely not provide a sufficient level of protection. The presentation discuss hardware, software, and protocol level countermeasures that substantially mitigate information leakage, as well as testing methods beyond FCC for quickly assessing the degree of protection.

The fact is, people steal cars equipped with RFID security. It's especially common in Europe, where RFID has been used in cars for longer than in the United States. To prove the weaknesses of the system, researchers at Johns Hopkins went about breaking in. What they found was startling. If you equip a laptop computer with a microreader, a device that can capture radio signals, you can capture the transmissions sent out by an RFID immobilizer key. Positioned within a few feet of the RFID transponder —say, sitting next to the car owner in a restaurant —the laptop sends out signals that activate the chip. When the key begins broadcasting, the reader grabs the code, and the computer begins decrypting it. Within 20 minutes, you've got the code that'll tell the car to start. (Once you have a good database of codes stored in your laptop, the time gets much shorter.).

Pair that code with a copy of the physical key or a hotwire job, and you're on your way. In the case of the passive ignition system, the process is similar, but you need only stand next to the car, not the person carrying the key. In cars that have RFID entry and ignition, it's an all-in-one process. Break the codes, and you can not only unlock the doors, but also start the car and drive away. According to some security experts, this is the problem with the system. RFID is a really great addition to a car's physical security system, but on its own, it allows for complete access with just a single act of decryption. For a thief with good equipment, it's a snap.

This is where the RFID, insurance and car industries object to the portrayal of RFID systems as faulty. Sure, the Johns Hopkins researchers could break it. They have money and hardware. The idea that car thieves would never take the time or spend the money to break an encrypted code is contradicted by the fact that a payoff of tens of thousands of dollars for a high-end car, motivate thieves to try. And whereas locksmiths weren't allowed to copy RFID-equipped keys at first, annoyance on the part of car owners who lost their keys led to a loosening of the rule. Now, both locksmiths and regular consumers can buy kits that can capture and clone an RFID code. The result is that people are losing their RFID-secured cars, and insurance companies call the owners' claims fraudulent because RFID security is uncrackable. The owners must be lying.

There are a few possible solutions to this problem that don't involve scrapping RFID. The Johns Hopkins scientists propose several ways to better secure the system: First, RFID makers should switch from 40-bit to 128-bit encryption; owners should wrap their fob in tinfoil when not using them, to help block fraudulent signals from activating transmission; and most important, carmakers should use RFID technology as an additional security measure, not the sole one. As with any other security system, the advice is simple: Layer up. Don't rely on any single protection method. Instead, use several different types of security in order to make it as complicated as possible to bypass.

SUMMARY OF THE INVENTION

A problem with current cards or documents in which the card is an integral portion, is the inherent insecurity being vulnerability to damage and defacement rendering such cards unreliable should they be involved within a disaster situation such as an earthquake, tsunami event or the like in a conventional two surface card or document that is open to public gaze and scrutiny both visually and electronically in several formats is vulnerable to striation damage caused by debris such as in a Twin Tower type event, earthquake, and the like that may also involve water or other fluid lubricant combining to cause surface damage to surface readable data including a surface mounted ICC such as found on a Personal Identification Credential etc to cause a malfunction of the document. Information on the card can be perceived by any observer and surreptitious copies may be made of the information that is visible on a card face. For example, a photograph may be taken of a card and used to duplicate the card as a counterfeit.

Documents with embedded RFID or contactless ICC type devices are intended to be remotely read by authorized agencies, yet anyone with an appropriate ICC and/or RFID interrogating device can gain access to and copy the extracted information so obtained, as well. Similarly, matrix codes, names, addresses, dates of birth, or other optically read information can be copied for nefarious purposes. Such a document or card is therefore, inherently insecure.

Virtually all documents and cards which serve either a governmental function or a commercial purpose contain limited amounts of information. Moreover, if a government issued card or document includes pictured photographic data of the holder that is a copy of that Governmental so called 'breeder' identification data because it has been validated by said government, it is possible that use of the card or document might be subjected to picture recognition software by unauthorized third parties such as criminal or terrorist affiliates. As a result, the governmental verified and authenticated 'breeder' identification data, biographical identification data and associated support data, such as encryption/decryption Key data embedded there, for example, in a machine readable line of data is available. All of this data can be retrieved and stored in a database linked to the picture and the individuals' derived facial recognition pattern or derived algorithm in one or several formats which, in all cases, may not be a desired result either for the individual or the government concerned.

Furthermore the surface data on such a card as well as any additionally contained RFID, such as Near Field Communication chip (NFC) can be compromised and no longer used as a credit/debit document or card. Such RFID NFC Chips, if contained within the conventional smart phone rendered inoperable due to disaster damage, if intended for disaster relief payment use as well as Fraud or misappropriation control. For example, a conventional purpose built disaster identification card such as the California Public Assistance card which is issued as a dollar value debit Card which equates to cash. This card, with NFC can be used for trusted aid distribution without cash disbursement or the Integrated Circuit Chip (ICC) Smart Chip are both vulnerable to abrasion and deformation damage in the event that the holder/user is involved in an accident or natural disaster. Accordingly, damage to such a card or document causes it to become unstable or malfunction, again not being a desirable outcome.

In the main, Cardholders should be educated to use Chip and PIN technology within a ICC card or other form of NFC. Attempts at solving the inherent weaknesses of the foregoing user experience, whether logging into an online bank, effecting financial transactions or making a payment are being developing within multi-function Europay®, MasterCard® and Visa® (EMV) card readers with multi-layer security that will, as purported, enable a secure client-side environment and enhanced two-factor authentication with Chip and PIN. This technology is purported to simultaneously effect the foregoing and enable banks to offer new services to their clients. However, the questions of privacy and secure data, especially for the holder/user to prevent their identity becoming involved in identity fraud at a government level as well as false or fraudulent financial transactions should always be a source of concern for the holder/user of the document.

BRIEF DESCRIPTION OF INVENTION

By utilizing the Automatic Data Acquisition (ADA) capabilities available within camera equipped commercial off the shelf (COTS) PS's, Smartphone's, Tablets and similar devices as the foundation hardware in lieu of additional microprocessor/s required to effect trusted ADA accordingly all transactions can be performed in a trusted multifactor operator or customer identified environment at minimal if any deployment cost over and above their normal cost of doing business. According to the present invention, a document or card is further subdivided into segments so that there are at least four faces capable of carrying information. There are two obverse or outer faces and two reverse or inner faces. The two segments may be joined by an integral hinge, either at the vertical side or joining the bottom of one segment with the top of the other or with a grommet that permits the segments to rotate relative to each other so that the normally concealed reverse faces can be displayed. In some embodiments, the grommet may itself be a security device that can disclose tampering.

Each document or card is preferably constructed of Opacity, fade, fluid and moisture resistant flexible material and or a laminate or layered construction of permanently welded or fused together materials into a single inseparable structure that, if bent or semi-deformed, will return substantially if not completely to its original finished shape or contour. Before being permanently welded or fused together into a single inseparable structure, each layer or lamina of the finished document or card in a preferred form would consist of two or more variable thickness rigid and/or flexible layers or laminates.

In a preferred embodiment, the card or document would be made up of several layers with a first layer of clear, wear and fade/opacity resistant material. A second layer could also be clear and fade or opacity resistant material having its reverse side security printed in a manner that would be tamper evident. A third layer can be colored to complement the security printed second layer and, preferably, is constructed to act as a faraday cage. Such a cage can be printed with a metallic ink or could be a layer of copper or other suitable material wire mesh.

A fourth layer can carry or contain a passive, transponderized, integrated circuit chip (ICC) or a plurality of passive or active transponders within ICC's which can act as a user controlled radio frequency database which can store digital certificate/s, PKI or other type encryption/decryption Key/s, Shared Secret information such as a Personal Identification Number (PIN) or a color sequence that can be entered by a operator in like manner to a PIN but capable of confusing an observer due to its unpredictable entry such as being embedded within variable color matrixes. Other shared secret information, such as biometric identification for the lawful holder or user of the document, such as can be found in a ICAO electronic passport, transport worker identification credential/card, personal identification verification credential/card, personal identification verification-Industry credential/card or other like device could be included.

A fifth layer of clear material preferably includes, on its reverse side, a security print that is tamper evident, A final or sixth layer should also be of a clear, wear, fade and opacity change resistant material, which can be permanently welded/fused together into a single inseparable structure.

Among the several features of the present invention is the provision of a caricature on a outer or public surface of the document or card of the bearer. This graphic image, which cannot be used in a facial recognition program, to a human observer, can be used to recognize the bearer as the person authorized to have the document.

An additional feature of the present invention can be the provision of a matrix code which can be recognized by a scanner, PC, Laptop, Netbook PDA or cell phone camera as an address or URL which can bring up a web page with information or other useful data preferably in encrypted form that is usable by an authorized operator. In the case of a document such as a transaction receipt, loyalty coupon or a discount coupon connected with a PKI Certification Directory or other type Digital Signature validation authority or entity for managing encryption/decryption Key/s for digital signing and validation purposes as well as encryption, decryption key management and trusted exchange for interchange with government, entities and commercial operation such as merchants. Any associated web page can provide an encoded personal identification number which can only be seen when appropriately masked by a specially configured portion of the document. The mask can be normally concealed when the reverse sides are adjacent and only the obverse sides are visible.

If desired, another matrix code can, when scanned, generate biometric information about the bearer which can then be independently verified by appropriate biometric sensors operated to check the identity of the card bearer.

Two factor identification is well known to those skilled in the art, but has severe limitations when used as "something you know", for example a PIN number. Because of the limitations of personal memory, for practical purpose a PIN would rarely exceed ten numbers. Such a PIN has an extremely low entropic value, particularly should it be considered for use as the basis for a public key within a Public Key Infrastructure (PKI) for the purposes of providing a digital signature or for secure cryptographic transfer of funds in a financial transaction.

According to the present invention there is taught how to deploy a Private cryptographic Key value that can be present as the second factor in a two factor Identifier system in financial or other transactions. This is of particular value for the deployment of Multiface Documents that contain confidential information and/or computational capabilities for use within secure and confidential financial transactions or other applications that would be apparent to those skilled in the art. Associated Virtual cards, as companion documents, can be contained within a securely lockable, owner controlled, virtual wallet.

This is of particular importance when portable computer devices are used over the internet to effect either the transfer of anonymised digital funds or in other trusted transactions such as keeping spending information between an individual and their financial institution restricted to only those two parties. This is accomplished, without regard to communication networks used to effect spending and the involvement of third parties who, though essential to delivering the transaction data, will not be able to relate said data to the said individual or the spending information, regardless of type such as direct transfer between accounts or to effect the delivery of cash from a so called ATM debit or credit card type transactions, even if delivered by so called cloud computing as well as traditional networks.

There is also taught the foundation methodology for effecting "something you know" into a high, non-reversible entropic value suitable for the provision of an extremely strong Public cryptographic Key suitable for use from relatively low processor power of the human memory and mobile devices.

In an embodiment which includes the embedding of an RFID chip also known as a radio frequency smart chip, an identification database held within an active or passive Integrated Circuit Chip ICC in the document or card (as is currently required under U.S. government policy for passports), a faraday cage screen can be embedded or imprinted on or in the document using a metallic ink on an intermediate layer on both parts of the document or card or so that when the reverse sides are adjacent, the RFID chip is completely shielded, protecting against unauthorized access. Alternatively, the RF antenna circuit can be interrupted and only connected with a pressure connection or a sliding switch.

It is also possible to imprint with metal ink on an interior surface or a laminate of the card's materials, the optically readable information normally included within a passport. When the interior surfaces are displayed, the information can be read, but when the interior surfaces are concealed, the information is no longer accessible.

In a first embodiment of the invention, the document comprises two cards each preferably a laminate of materials each preferably constructed of fluid resistant flexible material that, if bent or semi-deformed, will return substantially, if not completely, to its original finished shape or contour, joined at one or two comer/s by a grommet or a identifiable security grommet which allows the cards to be rotated, relative to each other, revealing the interior or reverse surfaces and the information contained thereon. In alternative embodiments, the two cards are joined by an integral hinge either at the side or at the top and bottom so that they can be folded together to conceal the reverse faces with only the exterior, obverse faces being visible In alternative embodiments, additional cards each preferably a laminate of materials and each preferably constructed of fluid resistant flexible material that, if bent or semi-deformed, will return substantially if not completely to its original finished shape or contour. By adding such a card or cards, there can be provided yet additional features, including constructed preferably from a clear material with an embedded wire or metal ink wire mesh that forms a dividing faraday cage so that Card 1 or Card II can be effectively RF protected while the card holder uses either individual card.

These card or cards can also provide the feature of a mask which can interact with a PC Screen or other such device that can read a matrix code, to mask such a code to both the operator and any other individual. This ensures that the mask obstructs the matrix code should a screen shot be taken either from within the device or from an external device from the display screen that is touch sensitive or mouse driven or a "smart phone" or other PDA device with an interactive display and internet access.

There can then be displayed on the screen masked patterns which can be recognized as an internet URL, or a onetime personal identification number, or a validation or confirmation code for use in such matters as card transactions without the need for the physical card. Receipts, single use, or other documents can be created and appropriately masked on the display which when unmasked, preferably only in close line, are recognizable by ATM machines. Also, such virtual mask capable documents could serve as a travel document, such as a boarding pass, that preferably provides that a biometric binding between the system administrator/operator and the end user be established in order that a biometric confirmation can be established.

In yet other embodiments, the document may be a "virtual card" which exists only in cyberspace but can be employed in conjunction with displayed information to effectuate a secure transaction. The concept could extend to a "virtual purse or wallet" which could contain several "virtual cards", each associated with a different application or business transaction. Each card could represent an account with a merchant or a bank and would include a code that can be displayed or deployed in operator controlled masked form that would start a contact or be used to confirm a transaction with the merchant or bank. Yet other functions can be envisioned for the "virtual card" such as health treatment cards, insurance cards, driver's licenses among others.

In all instances however, it is preferred that a biometric binding of the system administrator/operator and the end user be established in order that a biometric relationship can be established for most if not all transactions in the absence of strong PKI two factor verification and authorization as disclosed herein. This can be facilitated by a user dragging his caricature or picture and dropping it over a onetime transaction high density code, which may be masked in order to prevent observation or other covert use, to establish the recognition. Simultaneously, if required an integrated camera or other biometric data gathering device collects the biometrics of the user at that time and, preferably, should the transaction exceed an agreed threshold between the individual and their financial institution, both verifies and authenticates the user's identity so that the transaction can proceed.

Each transaction may at any stage create a high density code that may be in a display masked format and retained in a PC, laptop, netbook, smart phone or any other device with a memory, a display and an internet connection, for subsequent use. In some instances, the operator may be required to unmask the matrix code, but only in close line of sight of a data gathering devise in order to facilitate after validation and authentication wherein the authorized data gathering device only displays the matrix code data acquisition location points but not the matrix code obtained if necessary, by contemporaneously collected biometrics of the individual seeking entry at a gate, effecting a transaction at an ATM, entering or remaining in a secure area, or for medical purposes, including record transfers of any type and medical treatment authorizations or-other useful purpose. The foregoing high density code or matrix issued to be used by a secondary device such as a commercial transaction or for cash/payment type transaction such as cash-out or for delivery of cash from an ATM, the matrix can preferably be 'pixilated out' making it unusable and only readable to a automatic data acquisition type device associated with the foregoing type transactions when the operator presses a suitably enabled button, such as a side mounted volume button on a smart phone, tablet, PDA or other such device in order that a third party is unable to covertly copy such a valuable matrix before its use by the intended recipient.

Two factor identification between an entity and an individual using virtual templates wherein certain preset finger or other pointing device movements or actions performed by an individual on a touch sensitive display such as a smart phone, tablet or similar device activates the device or terminal's camera or cameras to collect an image or sequence of images or derived templates thereof and transmit all that data to the entity to confirm a card not present transaction. However, in like manner, an individual owner of such a device can perform multi factor identification to such a device using preset operator defined movements or actions performed by an individual on a touch sensitive display such as a smart phone, tablet or similar device to activate the devices operating system itself on which the follow on applications such as a user controlled "virtual wallet" or "purse" in which several different entities' virtual cards can be securely kept collectively and used only when the rightful owner chooses. This aspect takes on particular importance should the device holding the cards be lost or stolen.

"Virtual" credit or other entity cards, in addition to other user credentials, may be created as secure files and subfiles in a remote server accessible securely through the internet. The user or individual owner can create a personal virtual card with its own unique encryption/decryption trusted key exchange for the user's personal use, Such virtual accessible documents could be a birth certificate, marriage certificate, deeds to property, and any other valuable document whose presentation may be required.

Accordingly the ability to access any device or operating system that can run applications capable of effecting access to such user data should be a multi factor identification component of any device's own operating system so that the capability of even being able to attempt to run the individual controlled virtual wallet or purse or similar security sensitive application is denied to any person not capable of meeting a multifactor identification process as part of the device operating system itself or any time out or other user defined parameter. Once recognized, the locked virtual wallet or purse containing virtual credit, debit or other such financial transaction cards as well as encryption decryption keys can be accessed by a rightful user.

Activation of a device operating system has traditionally been user defined with the default setting being no action required or a so called personal identification number or PIN, something the operator knows and can enter into the device via a real or virtual keypad, or other such pointing device. Any such PIN, because of individual memory capability or the requirements of repetition, ensures that the PIN rarely exceeds eight characters and accordingly has a low entropic value. A casual observer can, over time, anticipate numeric key pad strikes. Alternatively, the PIN can be compromised by covert observation or recording a PIN entry and its potential subsequent use to the detriment of the individual owner.

For example, various colored spheres, circles, picture or cartoon that incorporate a user defined and memorized template can be displayed over an underlying and therefore not readily visible matrix which recognizes and responds to the predetermined template. The creation of such an underlying matrix allows the creation of a PIN with an extremely high entropic value in that multi factor identification can be achieved. The individual seeking to open a device operating system must; first—have possession of the device; second—know the position of the underlying virtual template behind the displayed color image that usefully can jog the user's recall of the template location in a manner similar to the retrieval of a forgotten PIN by being able to provide a first pet's name or other challenge; thirdly—the individual can touch, in sequence, the hidden template entry points; fourthly—the cadence of entry sequence can be timed; fifthly—tracing or tracking the digital/finger tracing pattern on a touch sensitive screen on a smart phone, tablet or other such device can be digitally recorded and, in combination, determine if an acceptable threshold of identification has been established. Further an encryption/decryption key set can be acquired by the device from the individual via a mini multisided card with such data contained within a matrix or matrices concealed on the reverse document surfaces.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

BRIEF DESCRIPTION OF THE DRAWINGS

FIGS. 4A and 4B shows the assembled document of FIG. 3 and by example FIG. 1 with the component parts being joined with a grommet;

FIGS. 16A, 16B, 16C, 16D, 16E, and 16F is a view of the layers comprising the other of a pair of laminated documents according to the present invention;

FIGS. 17A, 17B, and 17C, is a representation of a camera and optional Face, Palm, fingerprint, iris, retina or voice recognition equipped telephone for user authentication;

FIGS. 18A and 18B is a view of a document or card that within its laminates is an interrupted RFID two part circuit which is completed with either a pressure domed switch or a sliding switch;

FIG. 21 is a view of the display of FIG. 19 at a third stage of a secure transaction;

FIG. 23, including FIGS. 23A, 23B and 23C, shows the stages of a secure transaction using a "smart" cellular phone and a virtual card;

FIG. 24, including FIGS. 24A, 24B, 24C and 24D, shows the use of a "smart" cellular phone to invoke a transaction using a owner controlled and operated virtual wallet (FIG. 24D) or purse (FIGS. 24A 24B & 24C) to both secure virtual cards as well as facilitate their use by the owner with multiple entities;

FIG. 25 is a view of a display showing a "virtual" card at the beginning of a secure transaction;

FIG. 27, including FIGS. 27A, 27B and 27C shows alternative forms of user authentication;

FIG. 28, including FIGS. 28A, 28B and 28C shows forms of user authentication for access to virtual wallets, purses and lockers;

FIG. 29 including FIGS. 29A-29E shows yet other alternative forms of user authentication for access to virtual wallets, purses and lockers;

FIG. 30, including FIGS. 30A and 30B show yet other alternative forms of user authentication for access to virtual wallets, purses and lockers;

FIG. 31, including FIGS. 31A, 31B and 31C illustrates the display for a "virtual vault";

FIG. 32, including FIGS. 31A-32D, illustrate the use of the opened imprinted faraday cage to access RFID chips;

FIG. 33, including FIGS. 33A, 33B and 33C show alternative forms of bar codes or matrices;

FIG. 34, including FIGS. 34A and 34B shows an example of an alternative multiface document; and FIG. 35, including FIGS. 35A, 35B and 35C show yet a different alternative multiface document.

DESCRIPTION OF THE PREFERRED EMBODIMENTS

Figure 1:
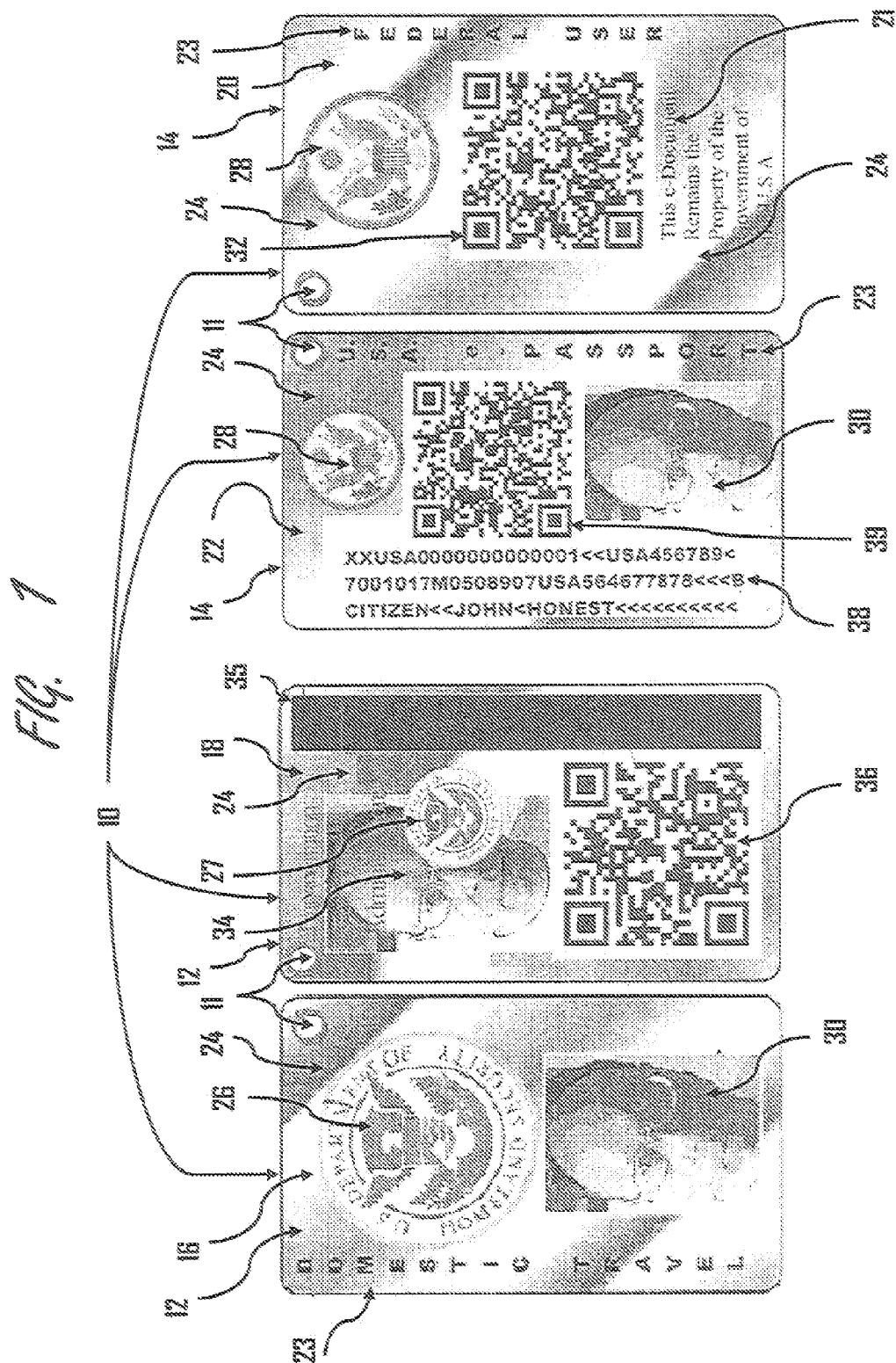
FIG. 1 is a representation of a document according to a first embodiment of the present invention.

In the embodiment shown in FIG. 1, a document 10 is provided with four (4) faces. In this embodiment, the document 10 includes two separate cards, card I 12, and card II 14. Each card 12, and 14 has an obverse face and a reverse face. As seen, card I 12 has an obverse face 16 and a reverse face 18. Similarly, card II 14 has an obverse face 20 and a reverse face 22.

As shown, the obverse faces 16, 20 include a distinctive colored pattern 24 to discourage counterfeiting and a document ownership statement 21. This pattern may further include security metallic ink and may be unique to each document's visible surface, including properties in the thermal infrared range. The obverse faces 16, 20, can also include an official user purpose or application generated with security ink, preferably a metallic ink 23 governmental seal, for example, a departmental seal 26 on obverse face 16 and a governmental seal 28 on obverse face 20.

A degraded image 30 of the bearer on obverse face 16 is sufficiently representative to enable a human observer to recognize the image 30 as that of the bearer. Such a degraded image 30 might be considered a "caricature" or "cartoon" and is intended to be unusable for facial recognition equipment. Accordingly, a surreptitious scan of the image would not allow any information obtained from obverse surfaces to be included in or associated with a database record that is otherwise associated with the bearer.

On the obverse face 20 of card II 14, an encoded matrix image 32 is imprinted, preferably with metal ink. This matrix image 32 can, in conjunction with a scanner, camera equipped PC, laptop, netbook, or tablet device, or any digital camera in a cell phone or other PDA device, be decoded to represent the address of a web site which, when invoked, can provide information about the document 10 and how it can be employed as, for example, as a travel document or a passport or other secure type application document.

The reverse faces 18, 22 are not normally visible but must be manipulated by the bearer or a person with the authority to view those faces. As shown, one of the reverse faces 18 includes a photographic image 34 of the bearer but partly overlaid with a departmental seal 27 to thwart facial recognition scans but still capable of human interpretation as being a photograph of the holder.

A magnetic strip 35 is included for the storage of magnetically coded information that can be read by a magnetic scanner. A digital matrix 36, when decoded, presents biometric data, preferably in an encrypted form, of the bearer which can be used to verify independently scanned biometric data at an inspection station.

The comparison of the stored biometric data with the independently obtained biometric data is used to confirm the identity of both the respective card and the bearer of the document 10. In accordance with the teachings of the present inventor, the biometric data of the document 10 and the currently presented biometric data can be compared with the bearer's biometric data that is stored in a remote data base and or the secure portable database contained in the matrix and card surface readable data to confirm that the bearer is the person that he purports to be.

In this example, the other reverse face 22 carries information usually found on a passport, including the governmental seal 28, an optically readable information strip 38 and a digital matrix 39. The caricature 30 is also included which sufficiently resembles the bearer so that a human operator can, in all probability, recognize the bearer as the person so caricatured to enable the visual matching of the two component parts 14 & 16 during assembly or should they become separated, deliberately or inadvertently.

In the example, card I and II are perforated at 11 in such a manner as to not interfere with the functionality of either card but to enable their conjoining with preferably an identifiable security grommet that allows their rotation by the holder's deliberate action to expose their obverse and reverse surfaces 12 and 14.

Figure 2:
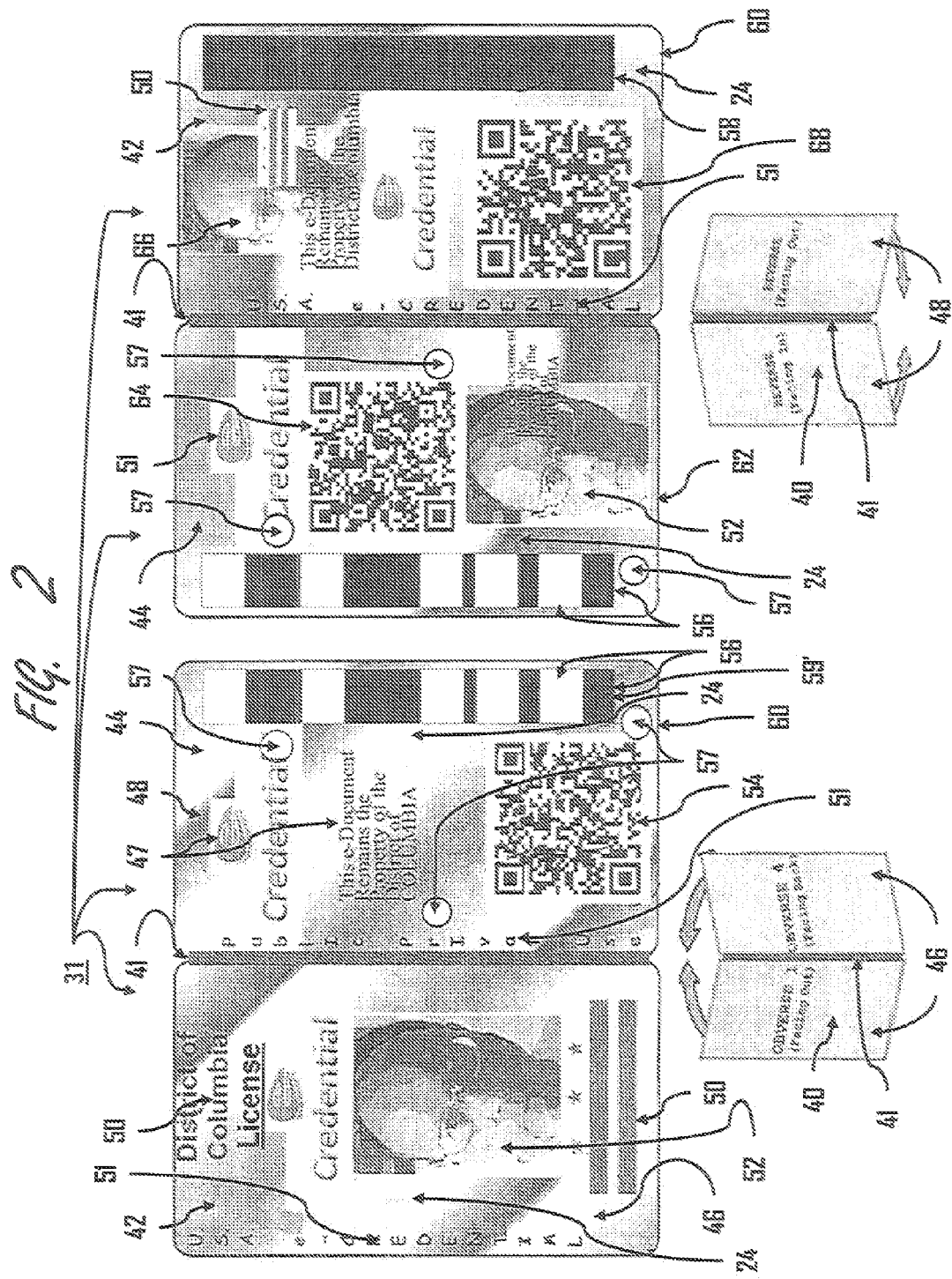
FIG. 2 is a representation of a document according to a second embodiment of the invention in which the parts are joined by an integral hinge.

Turning next to FIG. 2, there is shown an alternative embodiment of the document of the present invention. The alternative document 31, as in the embodiment of FIG. 1, includes two cards joined by an integral hinge 41, card I 42 and card II 44. For the present example, the document 31 could be a District of Columbia Driver's, or any other type of License.

Accordingly, the obverse faces 46, 48 include a governmental seal 50, a caricature of the bearer 52 and a coded matrix pattern 54, which, when scanned by an appropriate device, resolves into a web address where additional information can be found, preferably specific to the user. As in FIG. 1, a color pattern 24, unique to each document surface, can help prevent counterfeiting.

An additional feature of this embodiment is a transparent and obstructed mask strip 56 of the same color as the dark magnetic strip 58. As an example here the strip is divided into five holder specific zones which may be used in conjunction with an encoded display (better seen in FIGS. 16 and 22) that can reveal a selected alpha numeric code combination which, when entered, validates a transaction or verifies an inspection of use specifically in card "not present" (virtual card) transactions. To preserve the integrity of the mask 56, a dark magnetic strip 58 is located on the reverse face of the opposing card 42 so that when the document 40 is folded, the masking elements of the strip 56 will be obscured and not discoverable while the document or card is securely closed.

The interior reverse faces, reverse face of card I 60 and reverse face of card II 62, contain information normally hidden from public scrutiny and which is exposed only when the bearer wishes to expose it. Which information is on which face is a matter of choice and the faces could be considered interchangeable. In the present embodiment, the reverse face of card II 62 contains the caricature 52 together with an encoded matrix 64 which, when decoded, can provide secure personal and biometric information unique to the bearer, preferably in an encrypted form.

The reverse face of card I has a photograph 66 of the bearer, partially obscured by the seal 50 to defeat facial recognition software. An additional code matrix 68 can include other secure personal information including image and other biometric data as well as other data such as date of birth and place of residence. Much of the same biographic and or encryption key and or checksum-data information can also be encoded and stored on the magnetic strip 58, an important function of which is to obscure the mask pattern of the transparent, segmented mask 56. To facilitate the use of the mask 56, indexing or positioning points 57, here shown as clear spaces on both the obverse and reverse faces 48, 62 are provided. The card surface 44' is placed uppermost against the display screen of a computer, netbook, cell phone or other device which has an integral display screen, wherein the indexing apertures 57 can be positioned against single use indexing marks in order that the transparent apertures can be utilized.

Figure 3:
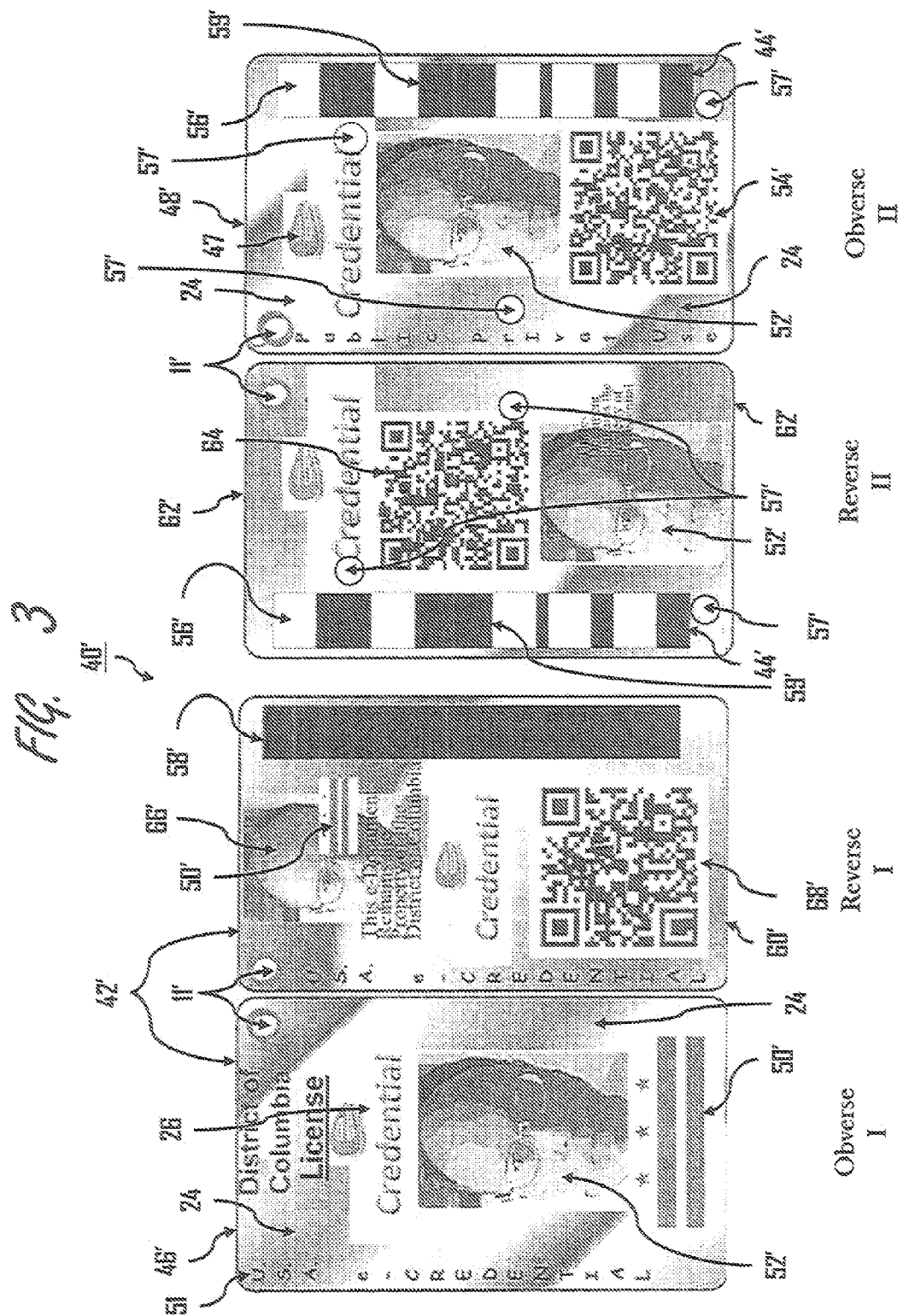
FIG. 3 illustrate an alternative embodiment of the document of FIG. 1 but with different surface and construction features.
Figure 4:
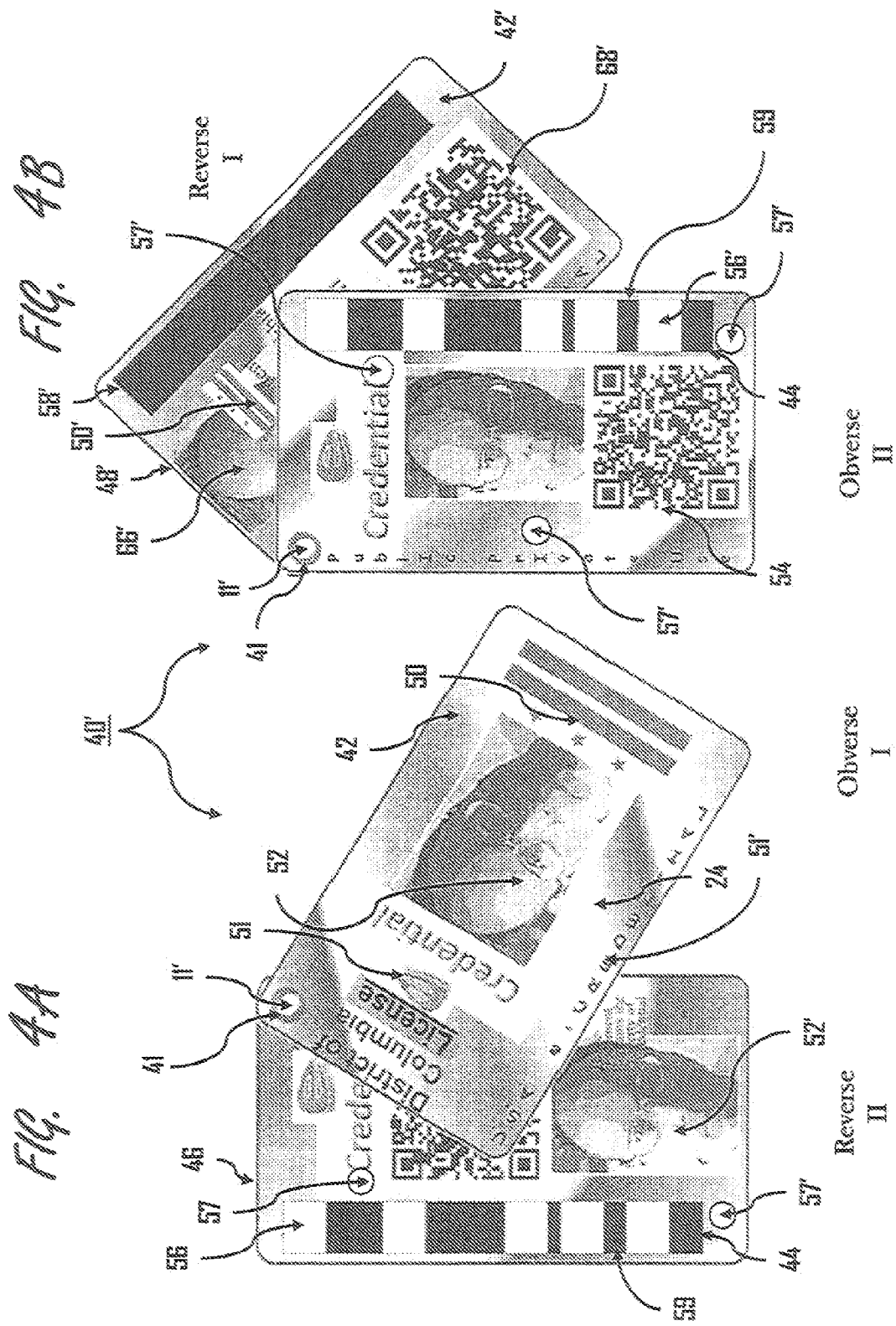
FIG. 4, including

Turning now to FIGS. 3 and 4, an alternative document 40', substantially identical to document 40 is shown with grommet holes 11' in lieu of the integral hinge 41, permitting the cards to be joined with, preferably, a security identifiable grommet (shown in FIG. 4). Similar, features will be given similar reference numbers with an added prime.

As in FIG. 2, the document 40' could be a District of Columbia Driver's License. Accordingly, the obverse faces 46', 48' include a governmental seal 50' and 47, logo type text specific to the documents functionality 51, a caricature of the bearer 52' and a coded matrix pattern 54', which, when scanned by an appropriate device, resolves into a web address where additional preferably individual user specific information can be found. As in FIG. 1, a color pattern 24, unique to each document, can help prevent counterfeiting.

An additional feature of this embodiment is a transparent mask strip 44, 56, 59' which may be used in conjunction with an encoded display (better seen in FIGS. 16 and 22) that can reveal a selected alpha numeric code combination which, when entered, can validate a transaction or verify an inspection. To preserve the integrity of the mask 56', a dark magnetic strip 58' is located on the reverse face of the opposing card 42' so that when the document 40' is joined closed as per hinge 14 as depicted, the masking elements of the strip 44 and 56' will be, as the user determines, either obscured or exposed.

The interior reverse faces, i.e. the reverse face of card I' 60' and the reverse face of card II' 62', contain information normally hidden from public scrutiny and which is exposed only when the bearer wishes to expose it. Which information is on which face is a matter of choice and the faces could be considered interchangeable. In the present embodiment, the reverse face of card II' 62' contains the caricature 52' together with an encoded matrix 64' which, when, decoded, can provide personal and biometric information unique to the bearer and can act as a secure portable database.

The reverse face 60' of card I' has a photograph 66' of the bearer, partially obscured by the seal 50' to defeat facial recognition software. An additional code matrix 68' can include other personal information such as date of birth and place of residence and can act as a secure portable database. Much of the same biographic information can also be encoded and stored on the magnetic strip 58' including encryption/decryption key and checksum data, which obscures the mask pattern or zones of the transparent portions of mask 56'. To facilitate the use of the mask 56', indexing points 57', shown as clear spaces on both the obverse and reverse faces 48', 62' are provided.

FIG. 4 shows the assembled components of FIGS. 1 and 3 being conjoined by a grommet preferably of a security and identifiable type 41'. It can be seen that when the document or card is in the closed position the five clear apertures 56 within the strip 59 are not perceivable against the matching dark background of the magnetic strip 58 which is specifically size matched for this purpose.

Figure 5:
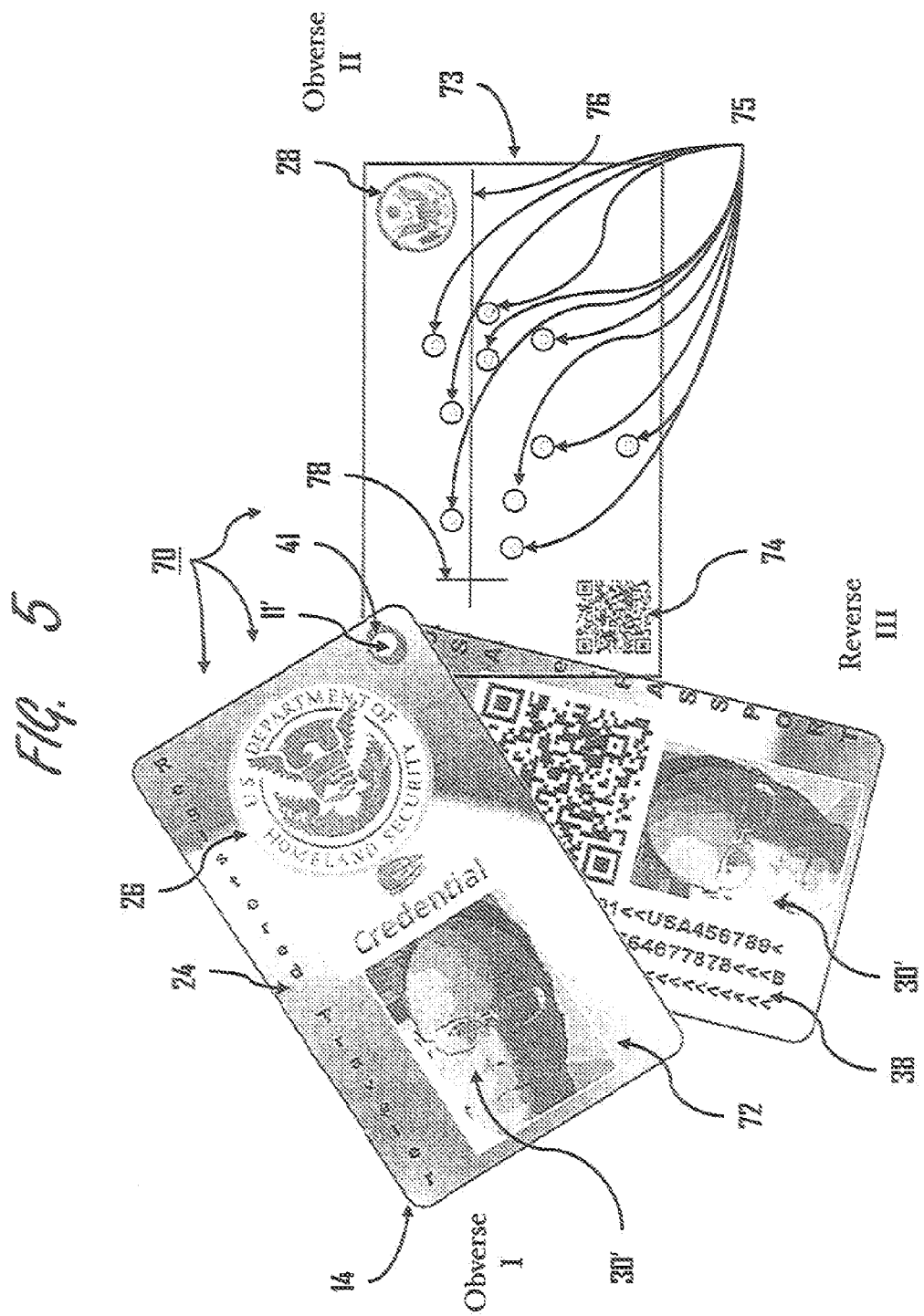
FIG. 5; shows the document of FIG. 1 connected using a grommet with an added document element.

FIG. 5 shows an embodiment similar to that of FIG. 1, but with an added document or card element 70. The obverse face of card 1", 72 differs slightly from the obverse face 16 of card 112. However, the card II 14 of FIG. 1 can be used without modification.

Added card element 73 is preferably a laminate inserted between card I" 72 and card II 14. Preferably, card element 73 is transparent with some additional features added such as the governmental seal 28 and a matrix element 74 which can perform the function of a secure encrypted portable database specific to that document or card 70 function and may include biometric data or templates of the holder. A plurality of viewing apertures 75, which may either be actual apertures in the card element or may be just printed or preferably security printed within the laminates with metallic ink circles defining the "real apertures" or otherwise. A horizontal indexing line 76 and a vertical indexing line 78 near one end of the horizontal line 76 are, preferably, again security printed within the laminates with metallic ink. The indexing lines 76 and 78 are used to align the card with an information presentation on a display screen so that elements of the presentation can be selected and can serve as a secure, one time, "card not present" (virtual card) personal identification characters, which, when entered, identify a particular user, much the same as PIN numbers.

Figure 6:
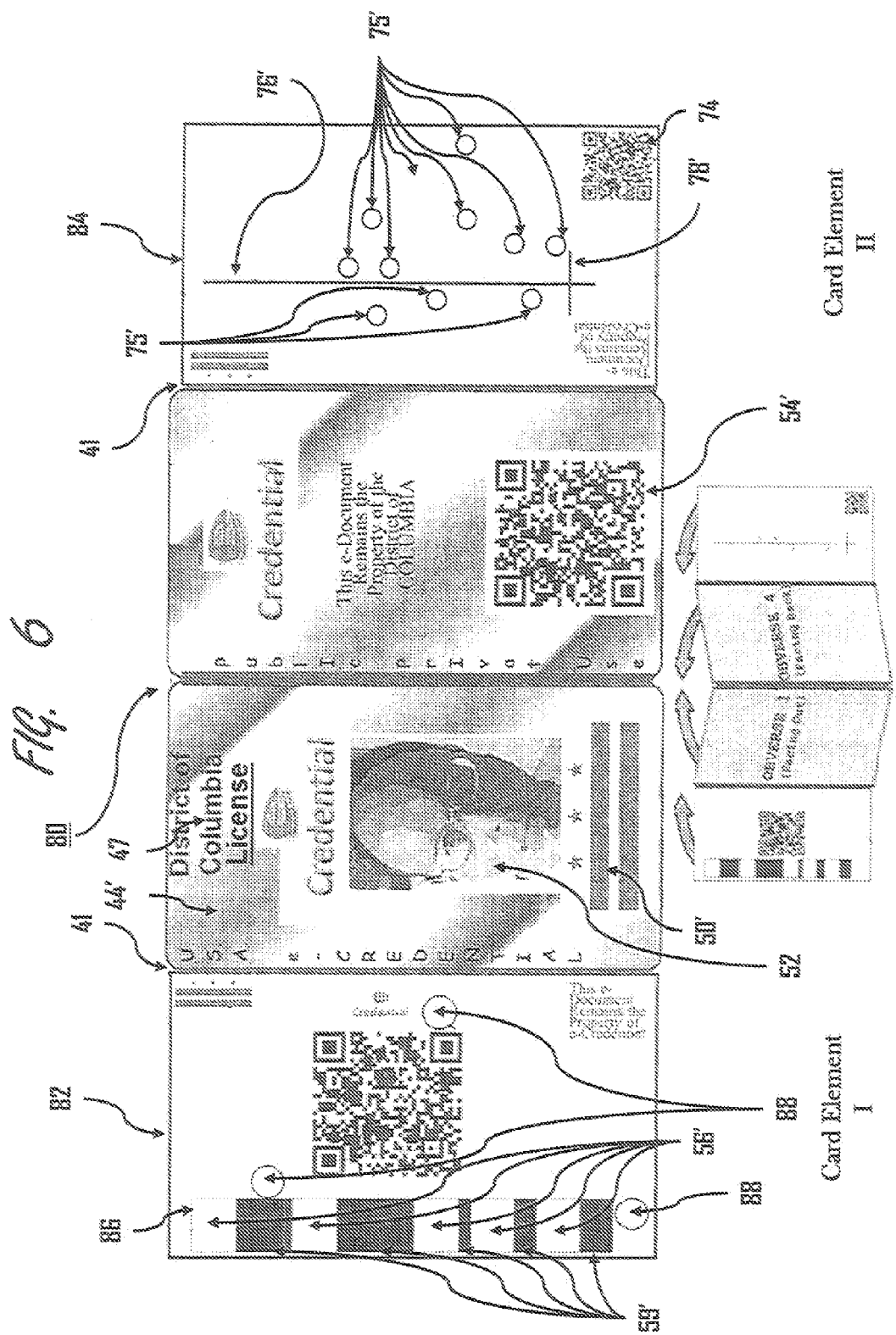
FIG. 6 is an alternative embodiment of the invention with four documents elements joined by integral hinges.

Turning to FIG. 6, a hinged document 80 functions much in the same way as the document of FIG. 1, in which the elements are to be joined, preferably, by a security identifiable grommet. In this embodiment, reverse surfaces can be utilized in like manner to FIG. 1, however in this case they are hinged as in FIG. 2 with additional transparent card elements 82, 84. Both elements 82 and 84 are constructed, preferably, as laminates as in FIG. 5 and are respectively used to complement the reverse surfaces to provide multi functionality with one document or card.

The first card element 82 includes a mask 86, similar to transparent mask 56. Card element 82 need not be transparent but includes indexing apertures 88 so that the card element can be aligned with a display to reveal alpha numeric characters in the mask 56 clear areas.

The second card element 84 is similar to the transparent card 70 of FIG. 5 and includes the same features, such as the viewing apertures 75' and the horizontal and vertical alignment lines 76',78'.

Figure 7:
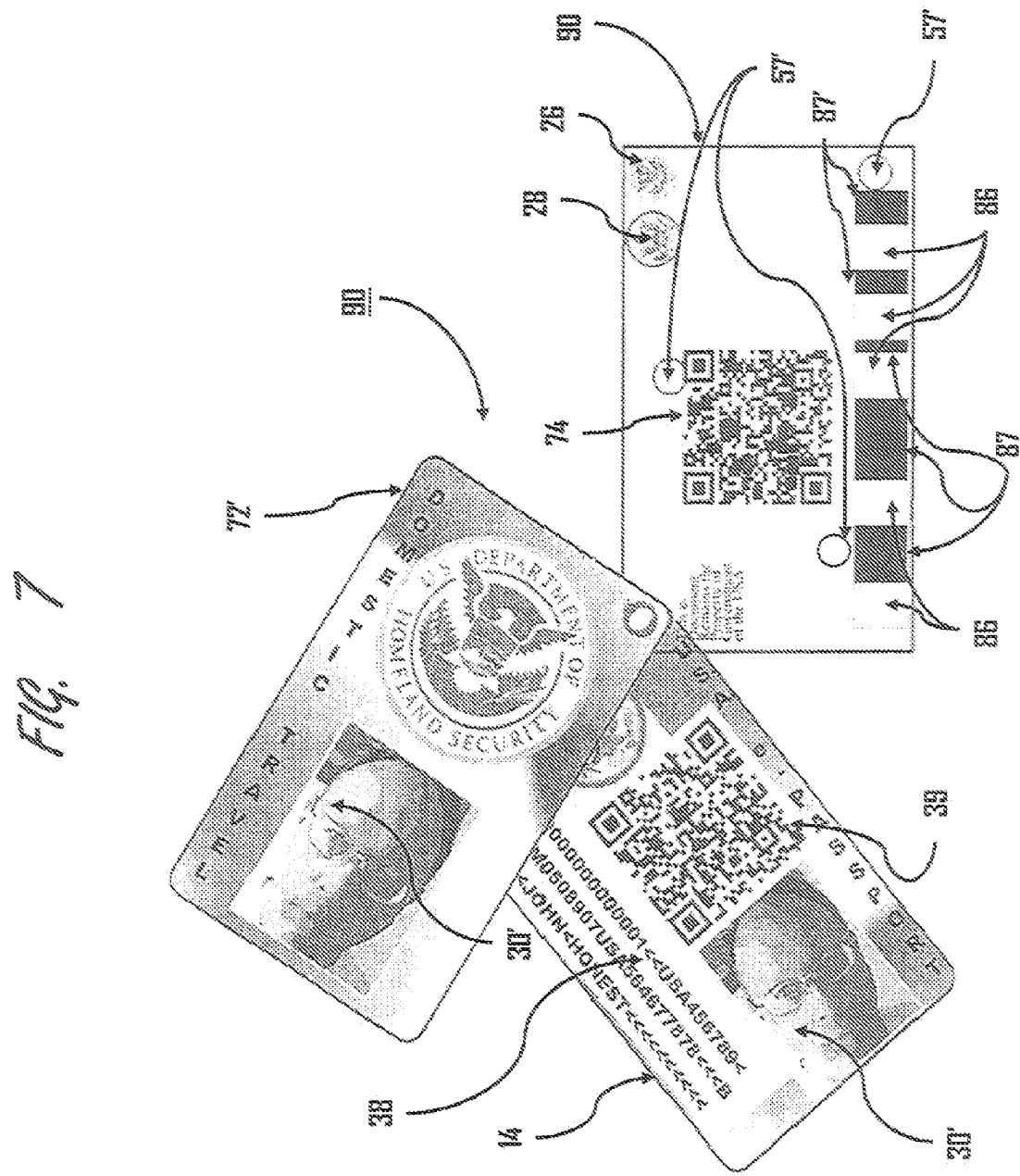
FIG. 7 is an alternative embodiment of the document of FIG. 5 with elements joined by a grommet and with an additional element having distinctive surface features.

Turning next to FIG. 7, there is shown an alternative form of the document of FIG. 5 with a different additional inserted card 90 between a first card 72' and card II 14. As shown here, card II 14 includes a caricature 30, the digital information strip 38 and the digital, preferably encrypted matrix 39, which may contain data as previously described.

The inserted card 90 can include a departmental seal 26 and a governmental seal 28. Also included are transparent alignment apertures 57, a transparent mask 86 and semi transparent or obstructed components 87. When aligned using 57 on a preferably touch sensitive display screen, it can be viewed through mask 86 to determine which alpha numeric characters on a display screen are revealed to provide a unique validation code. Preferably, element 90 is constructed to be similar to the FIG. 5 element 73

Figure 8:
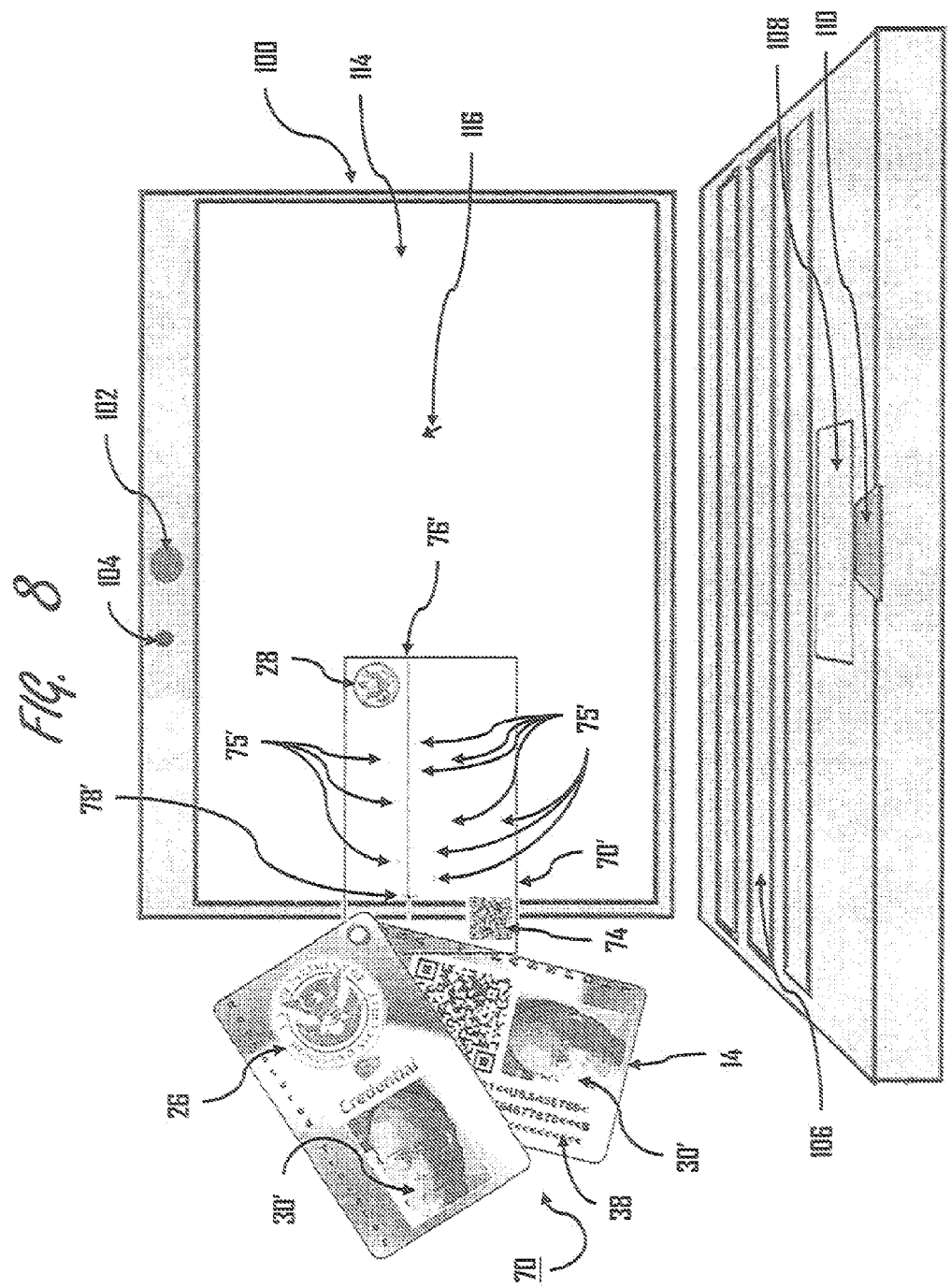
FIG. 8 shows the document of FIG. 5 in use with the display of a computer which will enable secure card not present transactions.
Figure 9:
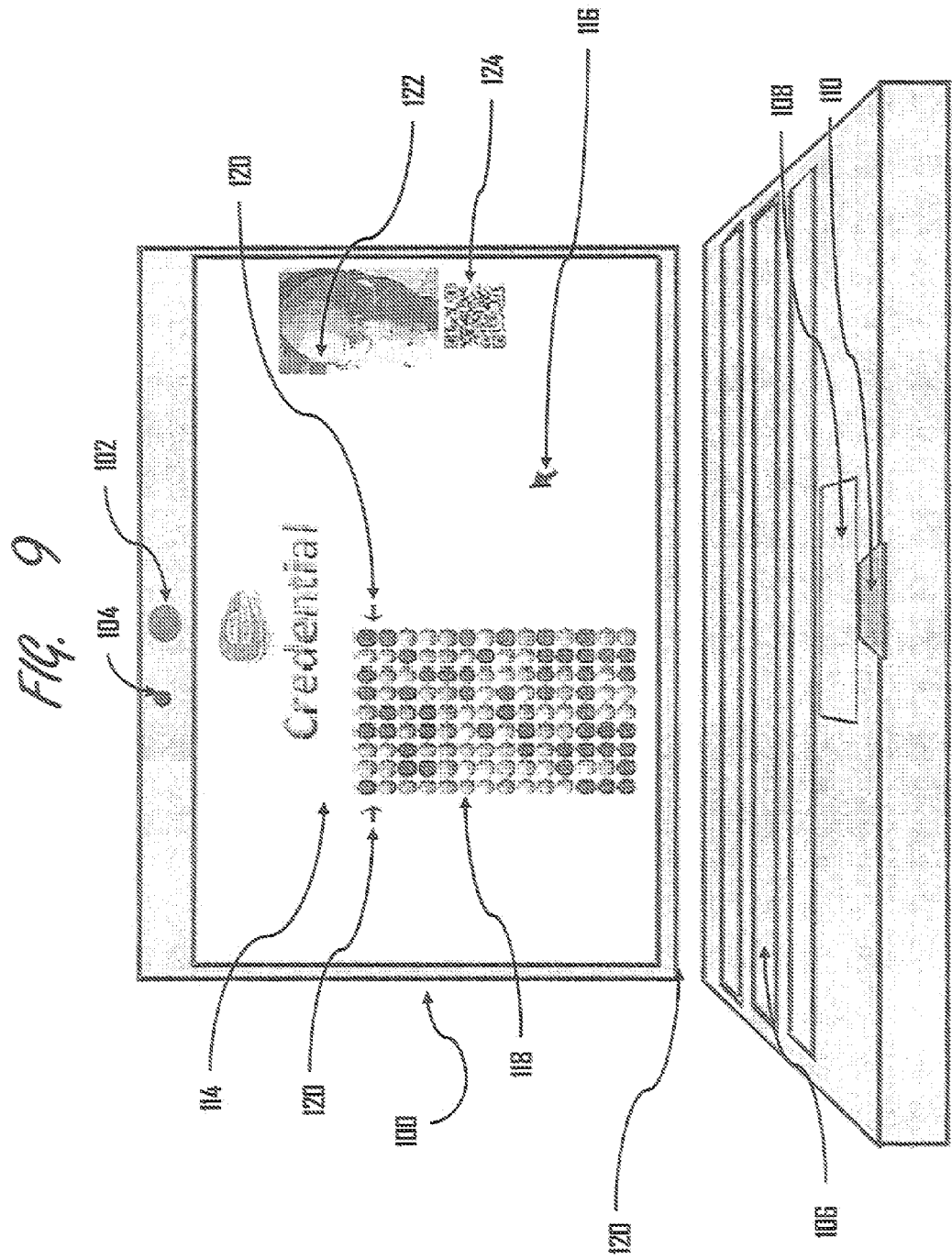
FIG. 9 is a representation of a computer screen containing information which is related to the use of a document for a secure card not present transaction.
Figure 10:
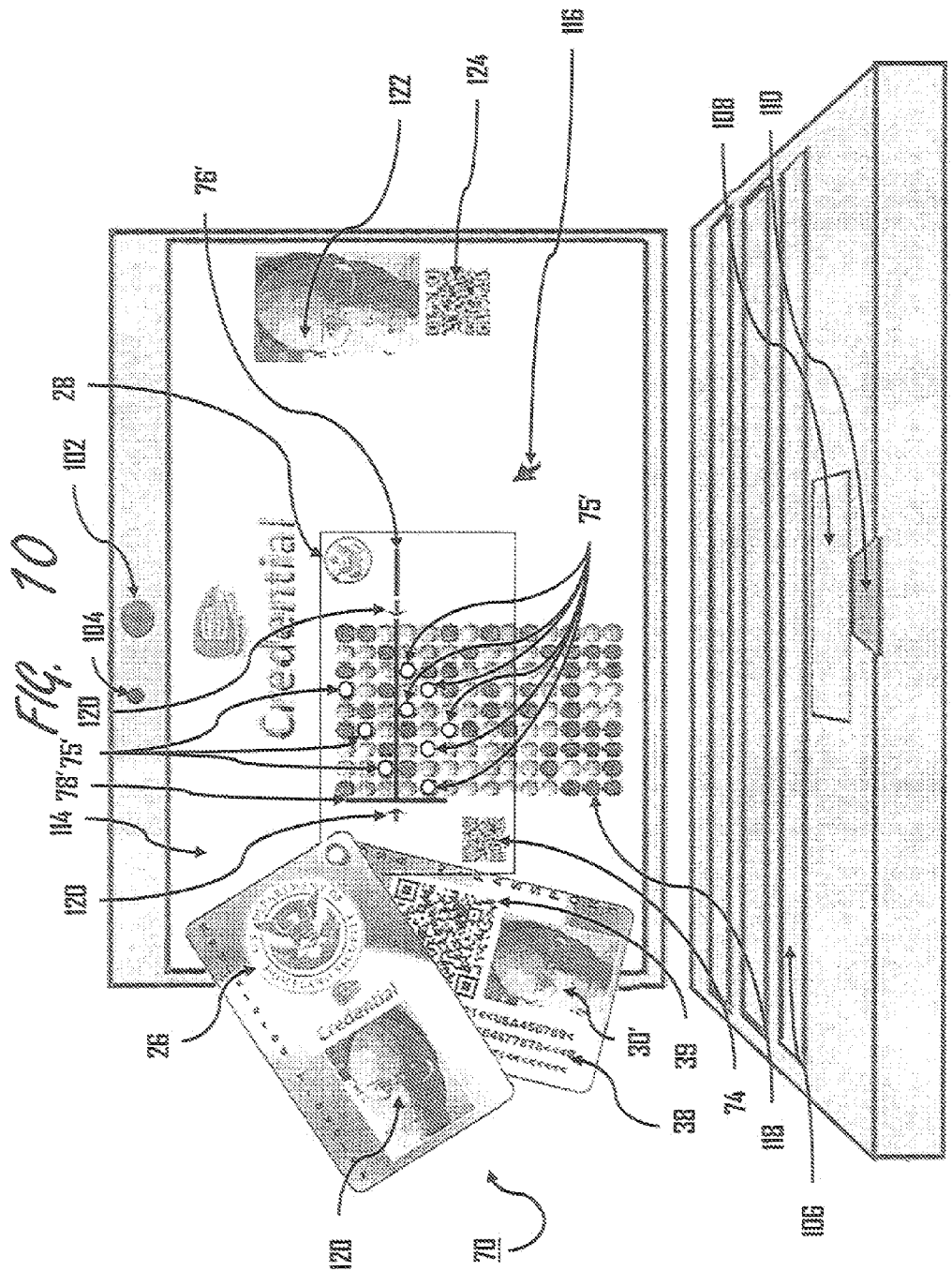
FIG. 10 shows the use of the document of FIG. 5 with the computer screen image of FIG. 9 to complete a secure card not present transaction.

FIGS. 8-10 illustrate the use of a document 70 in completing a secure transaction. In FIG. 8, the transparent card 70 is held against the screen of a display 100. Preferably, the display 100 includes an integral camera 102 and microphone 104. Also shown is a keyboard 106 that includes a touchpad 108 and a fingerprint scanner 110 in addition to the usual alpha numeric keys. The screen 114 is shown with a conventional cursor 116.

In FIG. 9, the screen 114 displays a matrix 118 made up, in this example, of various colored spheres or circles. A pair of indexing arrows 120 is shown adjacent the top of the matrix 118. During the transaction verification process, the matrix 118 can move about the screen 114 and the indexing arrows 120 can move vertically until all screen movement is paused by an appropriate key stroke or touch pad "click", at which point, the matrix 118 and indexing arrows become stationary, with the indexing arrows 120 adjacent a selected one of the rows of the matrix 118. The screen 114 also displays a caricature 122 and a digital transaction confirmation trigger matrix 124.

At the next step in the transaction, after the matrix 118 is paused, the transparent card 70 is placed over the screen 114 and the vertical line 78 is placed adjacent the edge of the matrix 118 and the horizontal line 76 is aligned with the indexing arrows 120. The apertures 75 will then be aligned with selected spheres of the matrix 118 elements, which when cursor 116 is maneuvered over them and clicked, will, on completion, activate a confirmation code combination. If the screen 114 is a touch screen, an operator digit or stylus movement may be traced and may be used to record the time pattern sequence by the operator to touch each of the revealed variable colored spheres to enable a system recognized access code or one time pin.

Alternatively, the cursor 116 can be drawn under each aperture and the selected character may be clicked.

When all of the revealed code characters have been identified, in a preferred embodiment of the system, the caricature image 122 can be dragged over the digital trigger matrix image 124. The integral camera 102 can then take an image or sequence of images of the user and, with the predetermined triggering of the matrix with the caricature of the intended user, the image of the user and the confirmation code can be transmitted to an appropriate organization where the confirmation code and image can be verified. If verified, the transaction is consummated. The transaction can range from a travel authorization or a visa to a transaction with a vendor of goods or services, as well as the issuance of a high density code or a virtual card which may have a single or multiple use functionality which, when displayed at a terminal or reader of any type, can provide verification and authentication, which can permit entry, payment or other useful purpose. The dragging of a caricature image 122 over the digital trigger matrix image 124 provides the basis for consistent positioning of the user for imaging and, where appropriate, be used subsequently for prosecution of fraud, inasmuch as all transactions are biometrically bound to the user and the customer with transaction specific encryption, decryption keys.

Figure 11:
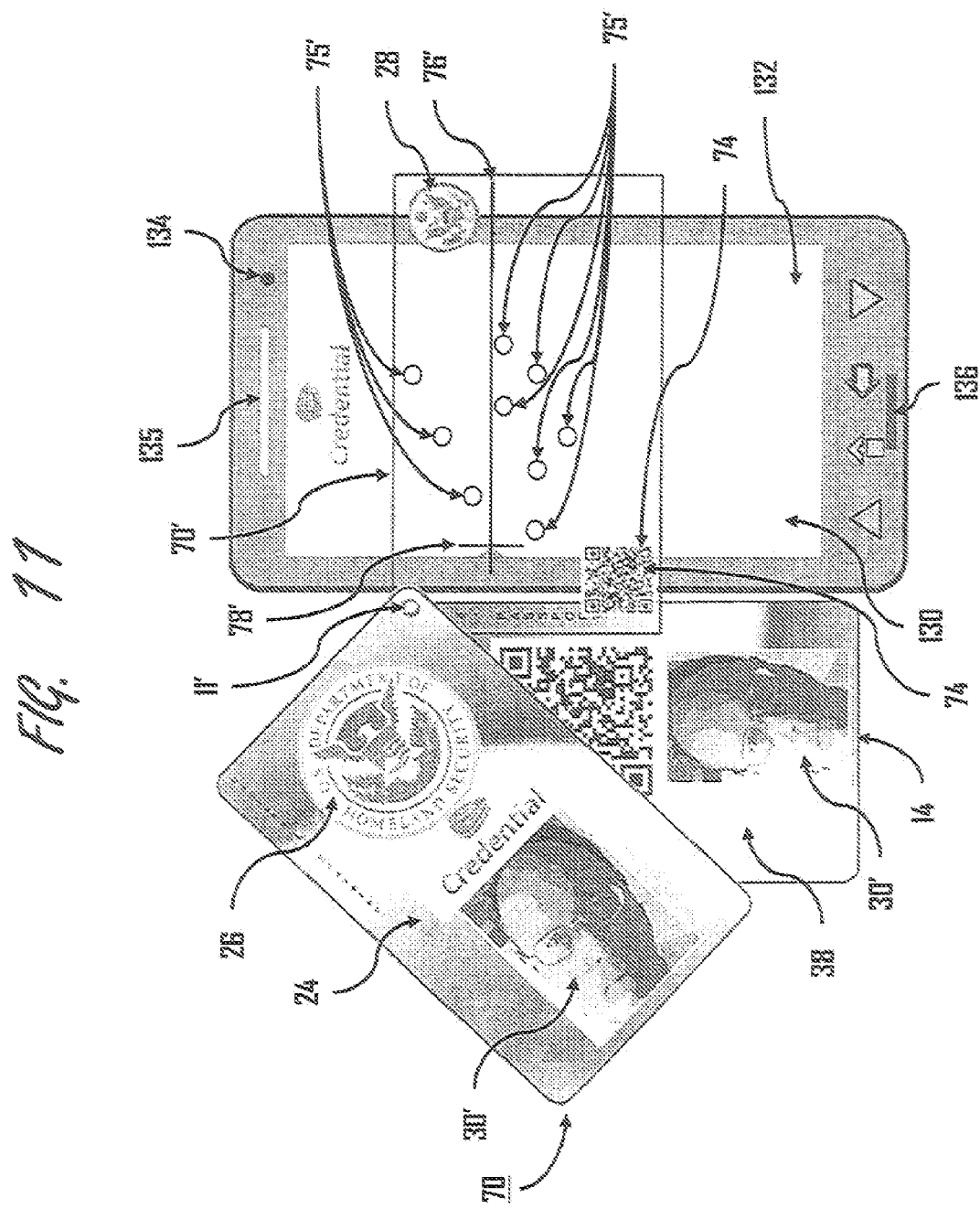
FIG. 11 shows the document of FIG. 5 in use with cellular telephone computer which will enable secure card not present transactions.
Figure 12:
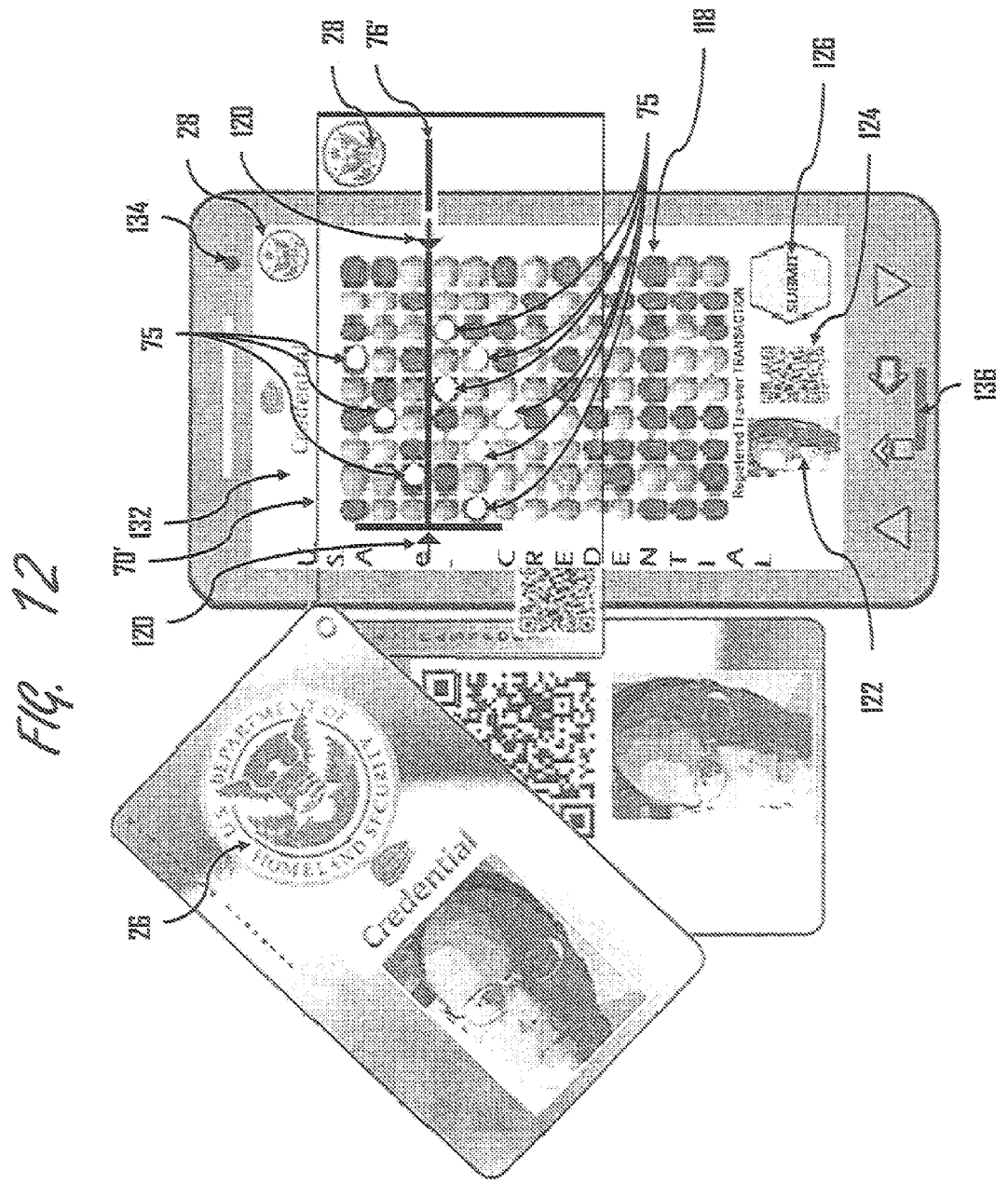
FIG. 12 shows the combination of FIG. 11 with a particular pattern presented on the telephone display to that of FIG. 9 which will enable secure card not present transactions.

FIGS. 11 and 12 illustrate a similar transaction utilizing a "smart" cellular phone 130 that has a touch screen 132, a camera 134 and a fingerprint scanner 136. A document similar to that shown in FIG. 5 includes a transparent card 70 which can overlay the smart phone screen 132 for a transaction. As shown in FIG. 12, the matrix pattern 118 is presented and may, until paused, move about the screen 132.

As in the previous example, the phone screen 132 displays the matrix pattern 118, the caricature 122 and the digital matrix 124. When properly aligned over the matrix 118, the apertures 75 will selectively reveal to the user the appropriate images that correspond to the security or confirmation code. When these are selected, using a stylus or finger pressure, the transaction can proceed. The camera 134 will capture the image of the user when, as required, the caricature image 122 is dragged over the digital matrix image 124 to initiate the transaction. Shown is a submit button 126 for use as may be necessary within the transaction. It may also be necessary to utilize function keys of the phone 130. The dragging of caricature image 122 over the digital trigger matrix image 124 provides the basis for consistent positioning of the user for imaging. If fraud is involved, the image can subsequently be used in the prosecution as all transactions are biometrically bound to the user/customer with transaction specific encryption, decryption keys.

On completion of the transaction, a receipt image or virtual single or multiple use card may be stored in the phone or secured within a virtual wallet contained as an application within such a phone or other such user controlled device, 130 to be displayed to an appropriate detector which will be able to recognize the image as a proper authorization for an action or procedure. For example, the receipt may be a boarding pass for an airline or an authorization for a withdrawal of cash from an ATM machine.

Figure 13:
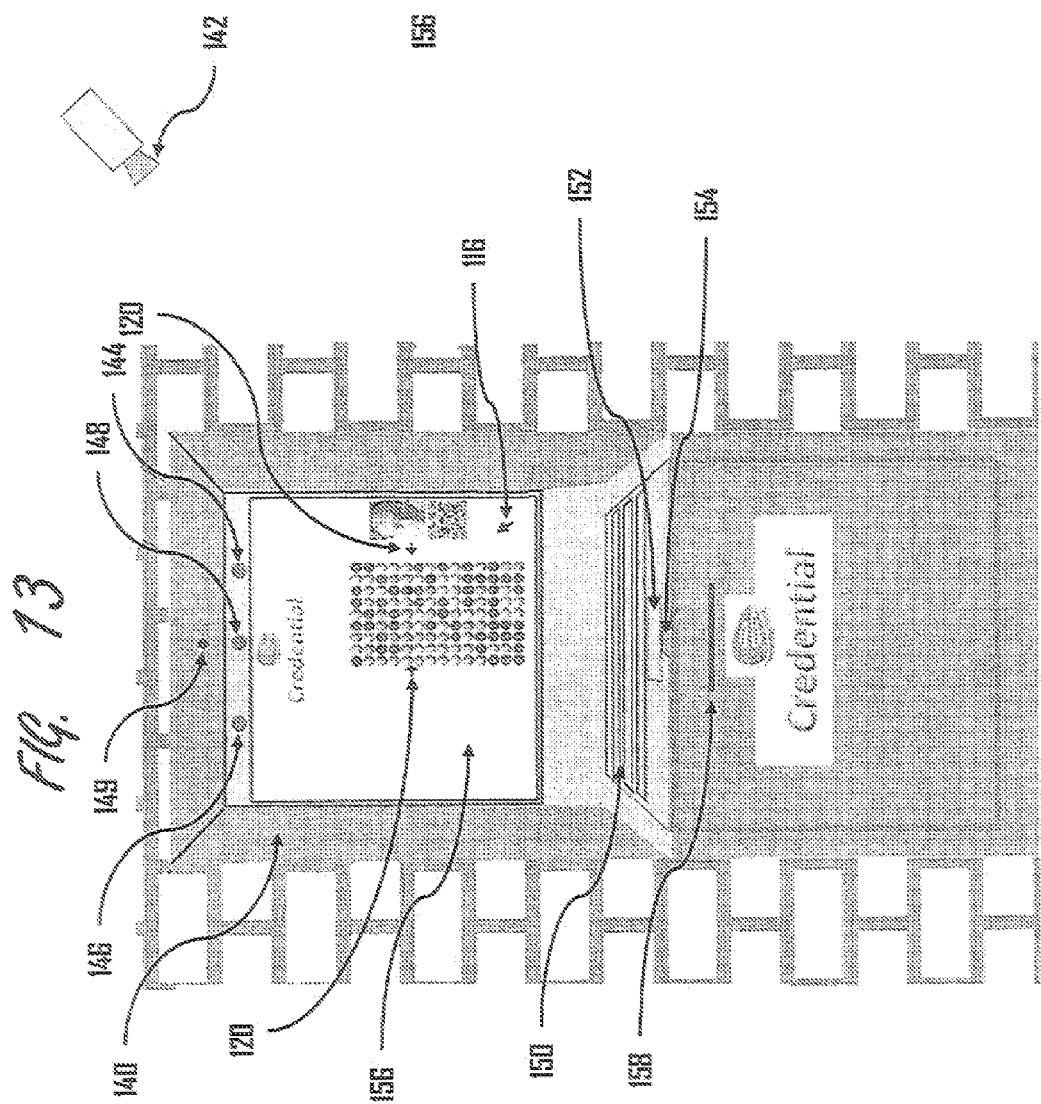
FIG. 13 is view of an ATM machine presenting a display to be used with a document according to the present invention.
Figure 14:
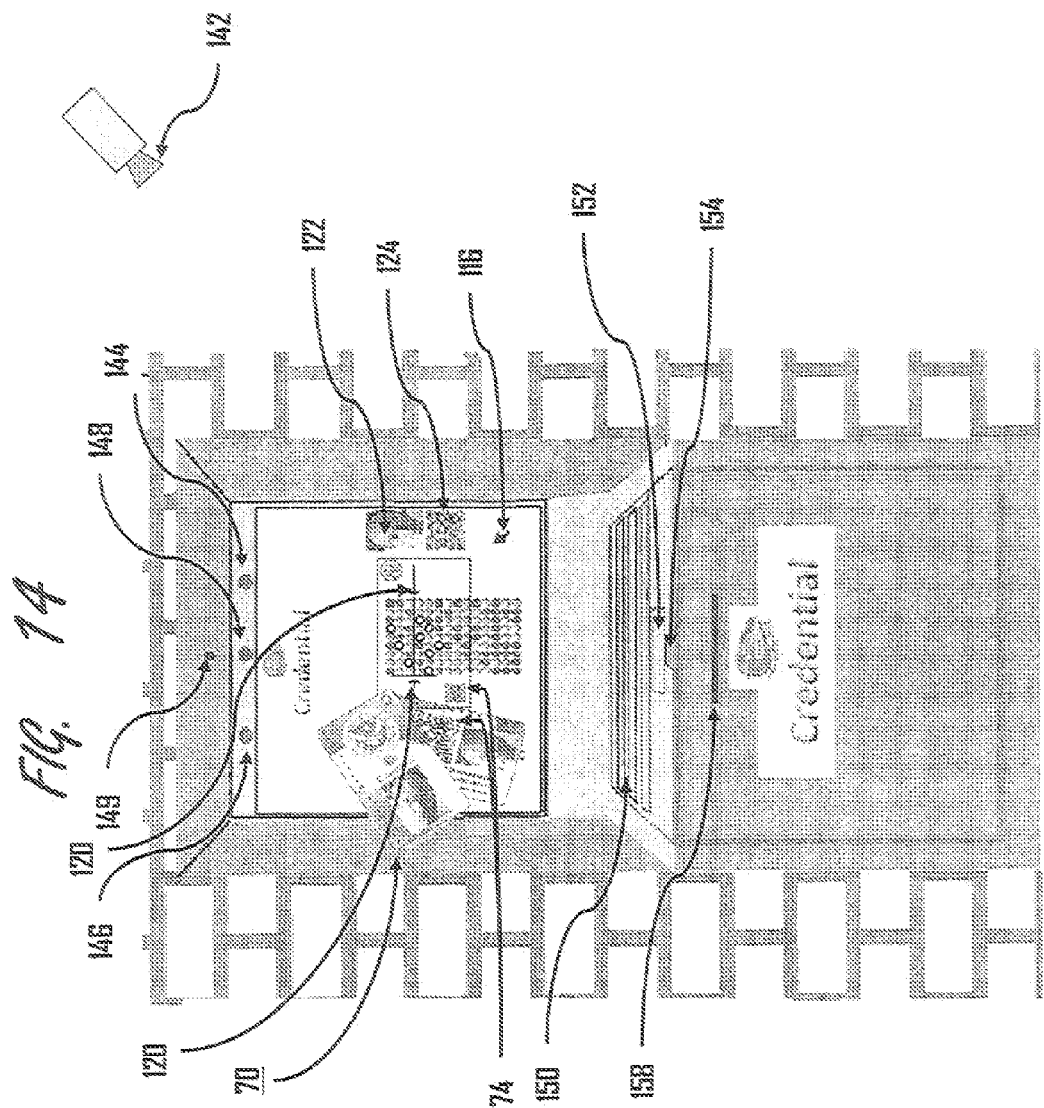
FIG. 14 illustrates the use of the document of FIG. 5 with the ATM machine of FIG. 13

FIGS. 13 and 14 illustrate a secure transaction at an ATM machine 140. A integrated security camera preferably with thermal infrared capability 142 is provided for surveillance to assure that the user is not under a threat or duress or using disguise techniques such as holding a face reconstruction, mask, mannequin or other ruse to defeat the biometric identification data gathering equipment as deployed. The ATM machine 140 is also equipped with a camera 144 and, if stereoscopic or three dimensional images are desired, a second, stereo camera 146 will enable the detection of three dimensional images which might be used to simulate the appearance of the bearer of the document. A thermographic infrared detector 148 can also be utilized to provide biometric information and to detect the presence of facial prostheses which may be used to create a disguise or other subterfuge. A microphone and speaker combination 149 allows voice communication or video conferencing capability with a system operator or manager.

As with a computer, the ATM 140 can also be equipped with a keyboard 150, a touchpad 152 and a fingerprint scanner 154. The display 156, which may be a touch screen, displays, after the user has been identified to the ATM machine 140, possibly through the use of an appropriate digital matrix pattern 74 on the document 70 which is scanned by camera 144. The moving digital matrix 118 is displayed together with the caricature 122 of the user and the digital matrix 124.

With the digital matrix 118 image paused, the transparent card 70' can be aligned with indexing arrows and the confirmation code can be ascertained. As in the earlier examples, the individual code characters are selected and the caricature 122 is dragged and dropped on the digital matrix 124. The user's image is taken by the cameras 144, 146 in combination with cameras 142 and 148 as a part of the transaction record and a desired amount of cash can be dispensed through the dispenser 158.

Figure 15:
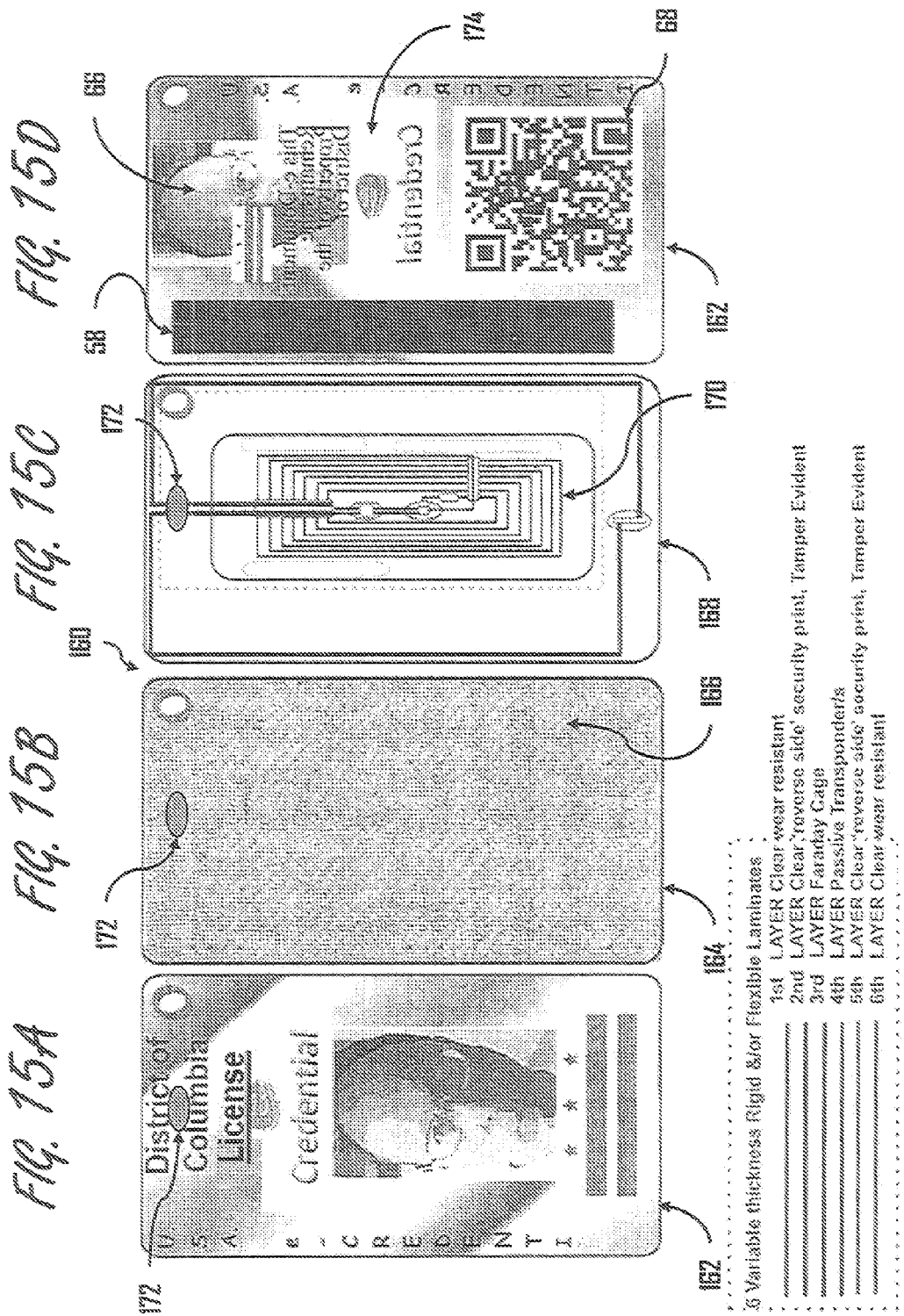
FIG. 15 including FIGS. 15A, A5B, 15C and 15D is a view of the layers comprising one of a pair of laminated documents according to the present invention.
Figure 16:
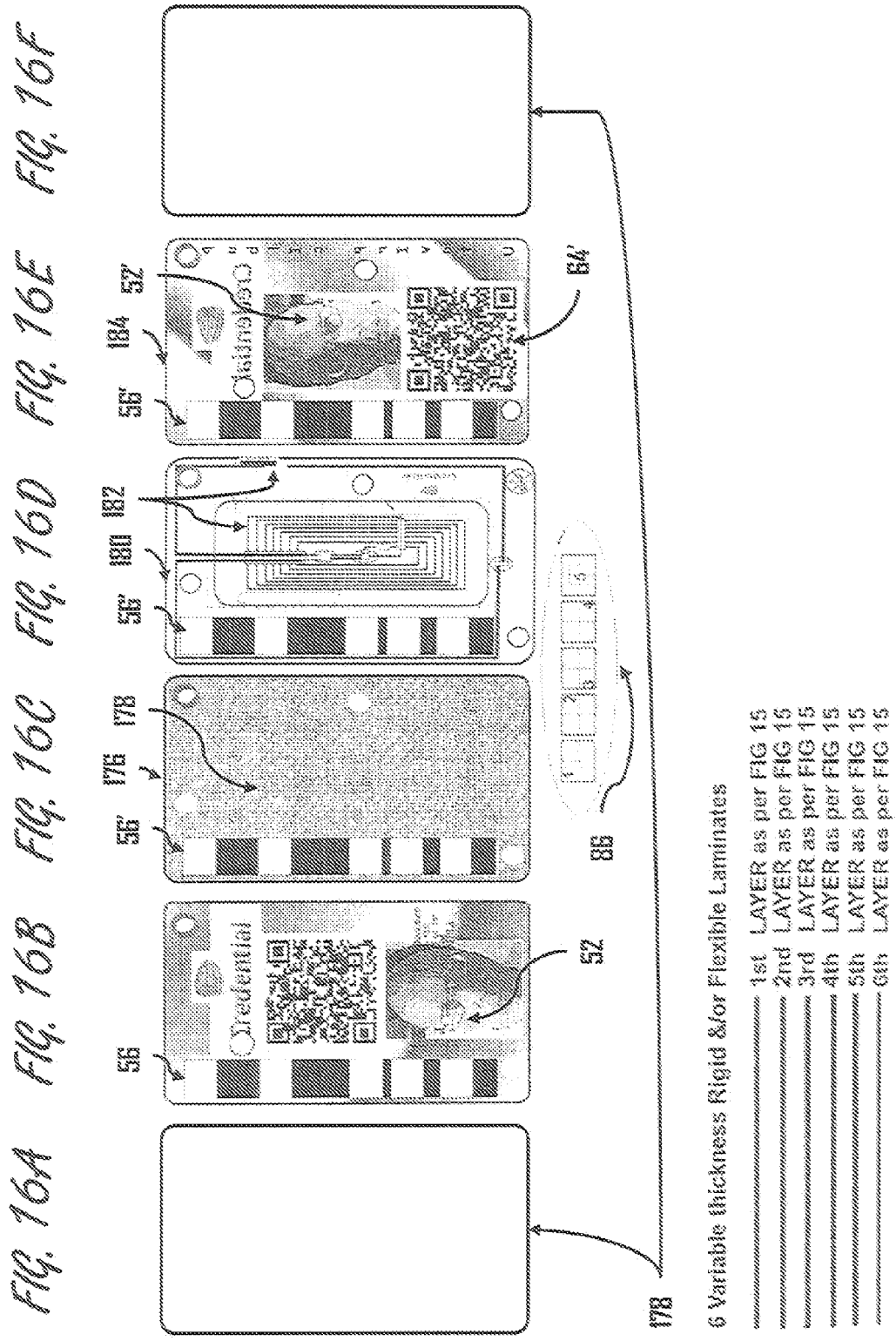
FIG. 16 including

FIGS. 15 and 16 show the construction of a typical document FIG. 15 including FIGS. 15A, 15B, 15C and 15D show the important layers in a laminated card 160 that includes an RFID circuit. In the preferred embodiment, there are six layers with the outermost layers being clear, wear resistant plastic.

The second layer 162, shown in FIG. 15A would be the obverse layer, here illustrated as a possible District of Columbia Driver's License. A next layer 164 would function as a Faraday cage and can either be a wire mesh or a layer imprinted into a mesh pattern with metallic conductive ink 166.

A fourth layer 168 is the RFID circuit 170 which can be printed using a conductive ink. If desired, a two part antenna circuit can be integrated and would be inactive under normal circumstances but can be activated by a user applying and maintaining pressure on a tactile detectable dome switch 172 through layers 1, 2 & 3 which is deactivated by manual release of pressure on the dome. Such a switch would make the RFID circuit normally inoperative and would require manual manipulation to complete the circuit and allow the RFID circuit to respond to interrogation at the total discretion of the user.

As seen in FIG. 15D, the layer which is to be the reverse surface 174 can be imprinted preferably using a metal ink [0012] in reverse on a clear substrate. The reverse surface 174 can include features (in reverse) such as the magnetic strip 58, the photo 66 and the code matrix 68. Preferably all laminates are constructed of fluid resistant flexible material and that, if bent or semi-deformed, will return substantially if not completely to its original finished shape or contour.

FIG. 16, including FIGS. 16A, 16B, 16C and 16D shows the construction of a card 178 containing a mask area 56 for acquiring authorization codes. The outer surface layers would be clear, wear resistant plastic. A second layer would be considered the reverse layer for this document and contains, for example, such features as a caricature 52 and a code matrix 64.

A next layer 176 is either a conductive mesh or a printed mesh 178 using conductive inks to act as a Faraday cage for this document. As can be seen, each of the layers includes the mask 56 with clear areas through which authorization or confirmation code characters could be seen. In preferred embodiments, each clear area could accommodate one or more characters which could be placed anywhere within the area. In one embodiment, four or even five characters positions 86 could be found or located in a single area, each in a different part of the area.

The next layer 180, (shown in FIG. 16C) contains an RFID circuit 182, similar to RFID circuit 170 of FIG. 18B wherein a side slider switch is provided to enable the RFID to be holder determined as always "on" or always "off". The next layer 184 has the reverse printed obverse layer of the document including reverse prints of the caricature 52' and the code matrix 54'. Preferably all laminates are constructed of fluid resistant flexible material and that, if bent or semi-deformed, will return substantially if not completely to its original finished shape or contour.

Using the above domed pressure switch controlled RFID and the slider type switch in combination within the same card as FIG. 2, 3, 4, 5, 6, or 7 provides a remarkable combination of user determinable functionalities within the single document or card.

Figure 17:
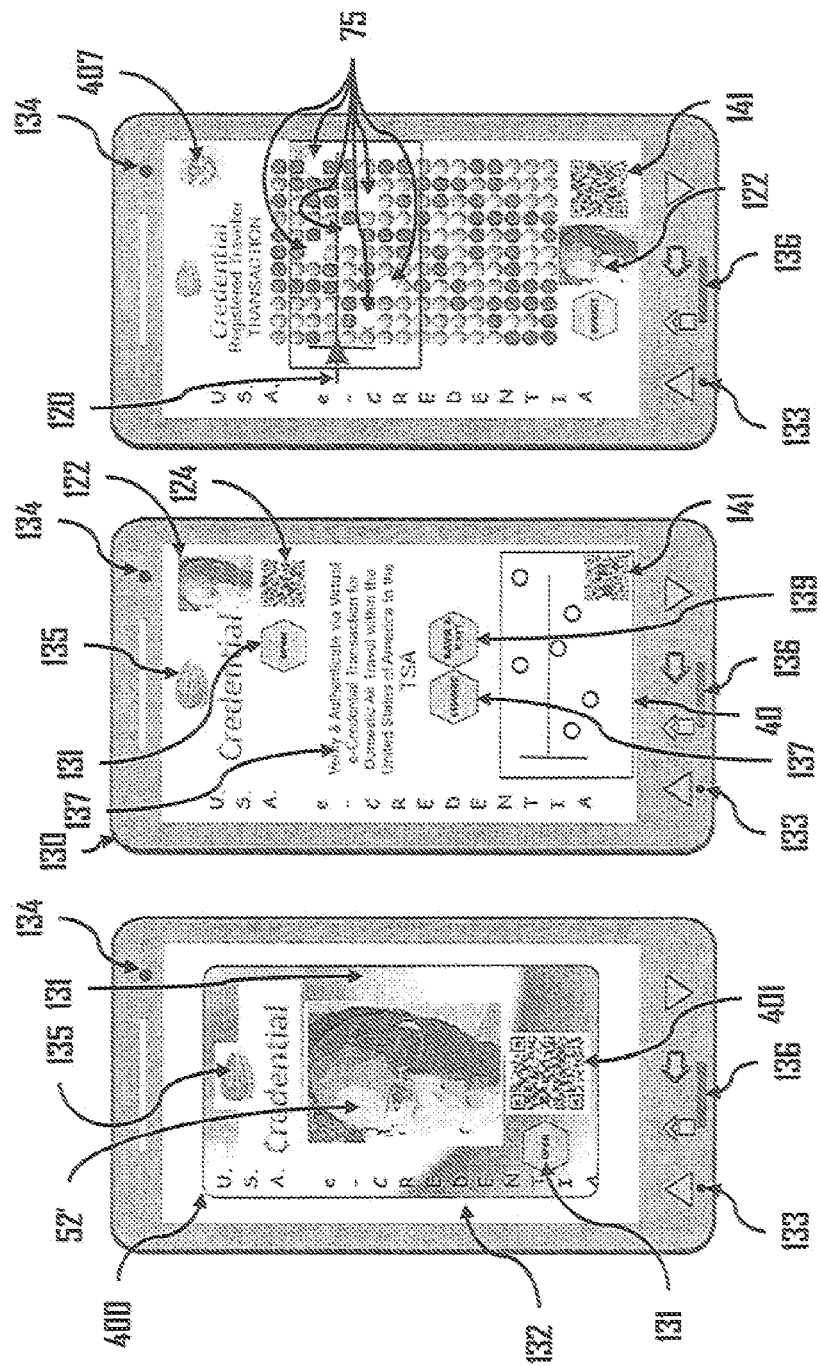
FIG. 17, including

FIG. 17, including FIGS. 17A, 17B and 17C illustrates an alternative use of the smart cellular phone 130 shown in FIGS. 11 and 12. Here a "virtual card" 400 which may be issued by an entity as a companion document to a physical card in any of the previously described forms would replace the need to carry the physical document disclosed above but retains the security and operational features of the above described real document.

Useful biometric identification data acquisition, particularly in an unsupervised environment, presents particular difficulties. Accordingly this invention utilizes a technique that insures the rightful owner of the card is, by task repetition, self pre-positioned for a camera, in similar manner to so called key stroke recognition, at the times when user verification is required to activate the virtual card.

In FIG. 17A the card 400 has a caricature 52 of the individual and a transaction specific security coded matrix trigger 401 which when displayed to a merchant would activate their terminal for subsequent use as per FIGS. 9, 10 with a virtual card issued by the card entity to the vendor for the virtual card holder's subsequent use. The vendor's terminal may require the completed transaction to conclude with the card holder dragging the displayed caricature over the transaction specific security coded matrix trigger. This activates the terminal's camera or cameras to collect an image or sequence of images or derived templates thereof and transmit all that data to the entity. On completion of a successful transaction, the entity would forward to the card holder's virtual card holding device 130 their receipt which may be in the form of a single use or multiple use matrix, which would be linked to the virtual card holder's biometrics. This could be required should the receipt be used as a boarding pass by, for example, the Department of Homeland Security or other agencies of the government.

In another method of use, the complete transaction can be initiated and completed via the virtual card holding device 130. After the virtual card holder opens the virtual card 131 via an application on device 130 a card transaction with the virtual card issuing entity 135 is illustrated by one such potential entity, namely an entity that conducts a ubiquitous universal biometric authorized and validated service to its customers but this could apply to a single card provider who each issues its own individual virtual cards in like manner.

A transaction is activated by initiating the displayed card's Open button 131. Thereafter, one such transaction could be with an air carrier that is required to interface with the US TSA for US domestic air passenger identification and travel authority. Accordingly the transaction may be conducted via several screens leading to FIG. 17B which initially displays 131, 135, change 137, save & enter, open 131 buttons and text 137. This screen is further used by activating the verification and validation transaction specific security coded matrix trigger 124 which is activated by dragging caricature 122 and dropping it over matrix 124. During this process, the device's camera or cameras 134 then collect an image or sequence of images or derived templates thereof and transmit all that data to, in this case, the entity interfacing with the TSA or directly.

On a satisfactory result, further display 400 is added with which is incorporated an active matrix relative to the template locators 57. The transaction continues in one of three ways, one button "save & exit" 139 is activated which terminates the transaction at that point to be resumed at a later time. Two, "change" button 137 is activated which results in another template 400 being issued, or. Three, the template 409 active matrix 141 is activated by touch, stylus, or cursor click.

Subsequently an active screen 120, as seen in FIG. 17C, is displayed as previously generally discussed FIGS. In 9 and 10 wherein locator 120 randomly moves about and is stopped on the user's selection by activating the transaction matrix 141 which stops locator 120 movement. The template is then dragged into alignment with locator 120 as illustrated and the displayed colored spheres are activated via the template 75 locators. The system then recognizes the allocated alpha numeric code relative to matrix 141 against the position selected by locator 120. When the card holder completes this "card not present" action caricature 122 is dragged over active matrix trigger 141 which again activates biometric camera sensor 134 as previously discussed. A successful transaction is indicated, preferably, by the addition of their departmental seal 407 or further biometric identification may be signaled to be submitted via finger print sensor 136. Actuating the "submit" button 405 terminates the transaction.

Thereafter, as previously discussed, a virtual receipt or pass may be issued that bears the respective caricature. A single or multiple use active matrix, is required as to the requesting individual's use of respective entities system or network of systems. Preferably, a caricature 122 of the expected card holder is displayed together with a transaction encrypted security matrix issued for the next appropriate use.

For additional security purposes, a fingerprint may be required to be scanned by the scanner 136 and a photo image can also be taken by the camera 134 before any transaction commences. Should it be necessary, the "open" button remains inactive until this action is completed at which time it is illuminated to signal that the required biometric data has been collected. Thereafter, the transaction proceeds after the "open" button is touched on screen 132. This touch results in the transmission of the fingerprint and photo for biometric recognition and, when recognized, a transaction screen is presented, as shown in FIG. 17B. Thereafter, all actions are the same as the above.

Again, on completion as above, a confirmation receipt of a successfully completed transaction can then be sent to the phone for later use. If the transaction sought is a travel authorization, the stored receipt could later be used at embarkation and or debarkation points to permit access to the facility, transport vehicle or other appropriate uses.

Figure 18:
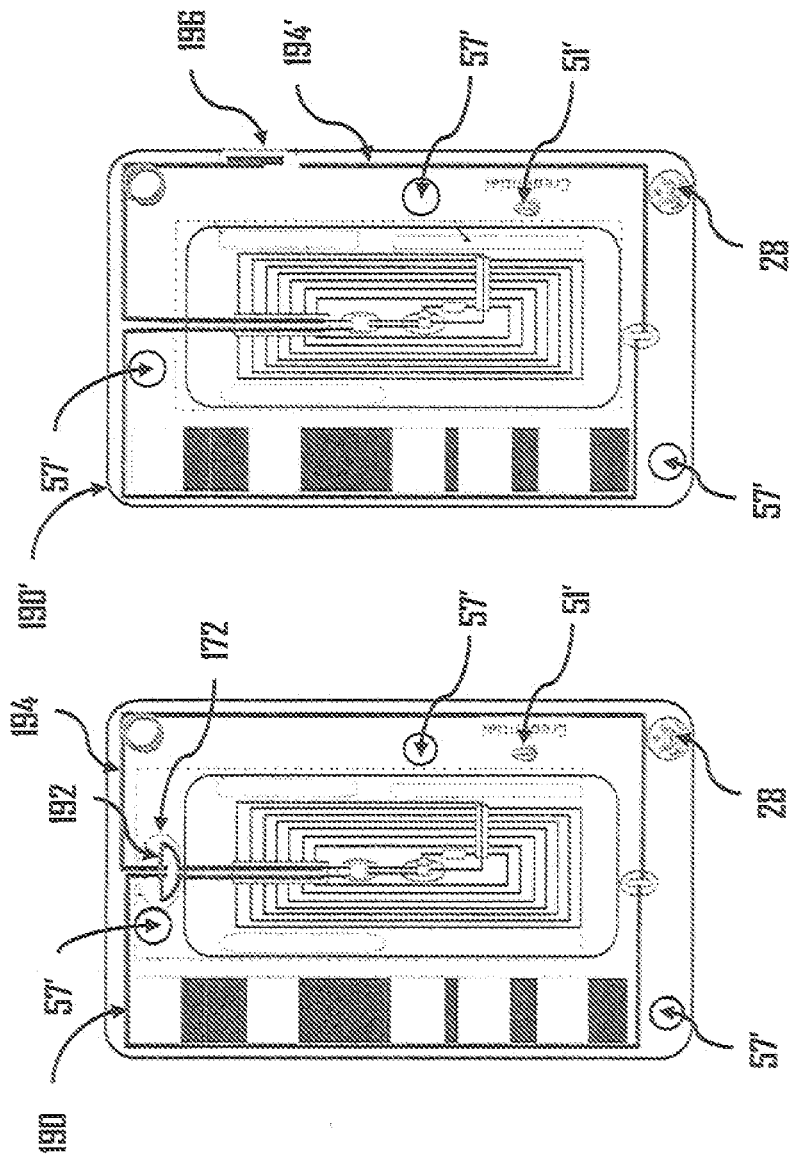
FIG. 18 including
Figure 19:
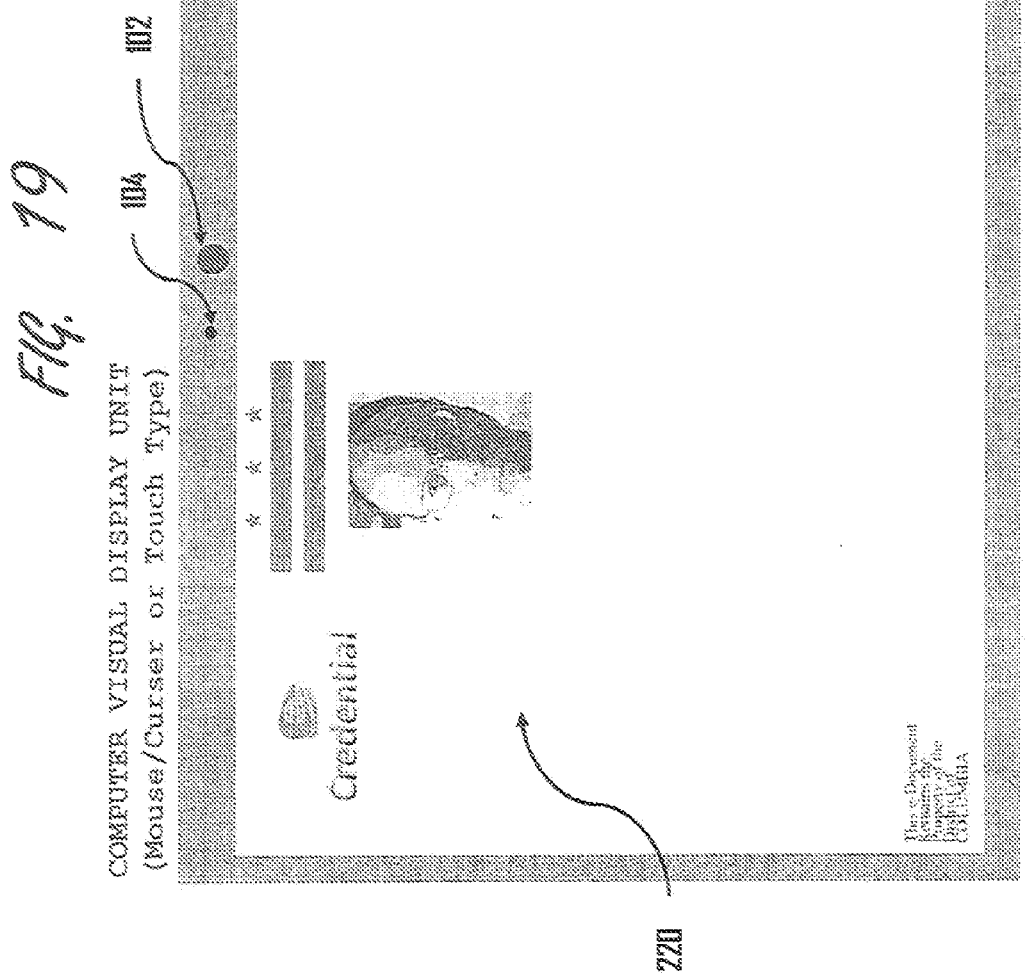
FIG. 19 is a view of a wireless internet computer integrated display at the beginning of a secure transaction.

FIG. 18, including FIGS. 18A and 18B, shows alternative RFID devices which can be separate documents on a card that can be inserted into or on a laminate of the card of, for example, FIG. 2, 3, 4, 5, 6 or 7. The RFID device 190 of FIG. 18A is provided with a dome 172 to activate pressure switch 192 which is normally open and, accordingly, interrupts the antenna portion 194 of the RFID circuit. Manual pressure on the switch 192 completes the circuit, allowing the RFID circuit to respond to interrogations.

Similarly, the alternative RFID device 190' of FIG. 18B is provided with a slide switch 196 which interrupts the antenna portion 194' of the RFID circuit, thus disabling it. When the slide switch 196 is closed, the circuit is completed and the RFID circuit can respond to interrogations. Using the slide switch 196 permits the RFID circuit to be in an active or inactive state without the need for maintaining pressure on a switch.

An official Government Seal 28' or corporate icon 51' can be security printed with metal ink for authentication purposes and may have an imbedded coded number.

Figure 20:
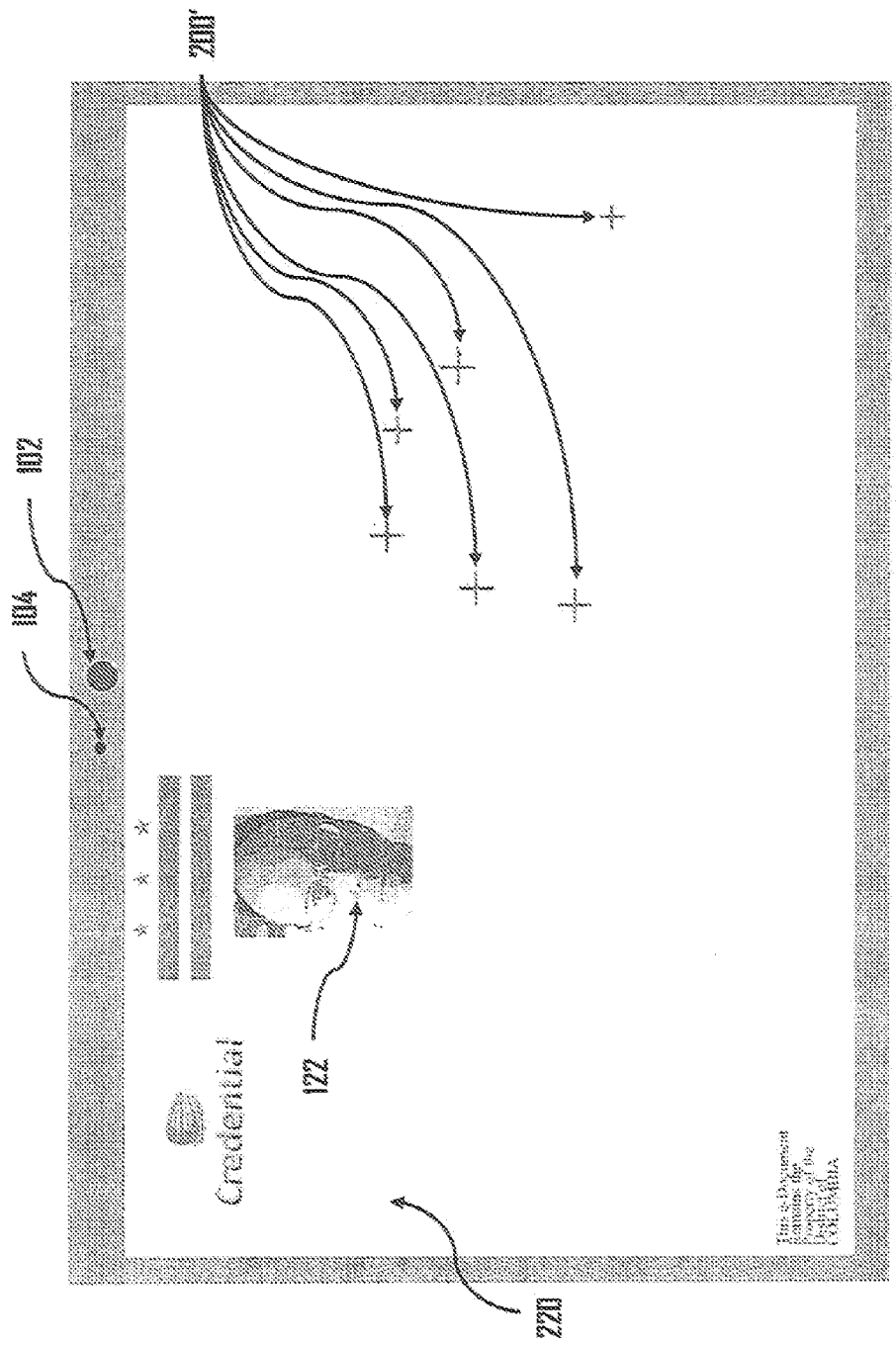
FIG. 20 is a view of the integrated computers display of FIG. 19 at a second stage of a secure transaction.

FIGS. 19-22 illustrate the steps in a secure transaction utilizing a different form of an authenticating or confirming code while utilizing a document as in FIG. 4 and a touch screen display as shown, for example, in FIG. 8. In FIG. 20, a group of indexing elements 200 are displayed to enable alignment with the indexing apertures 57' so that the mask 56' can be used to find the characters comprising a confirmation code.

Figure 21:
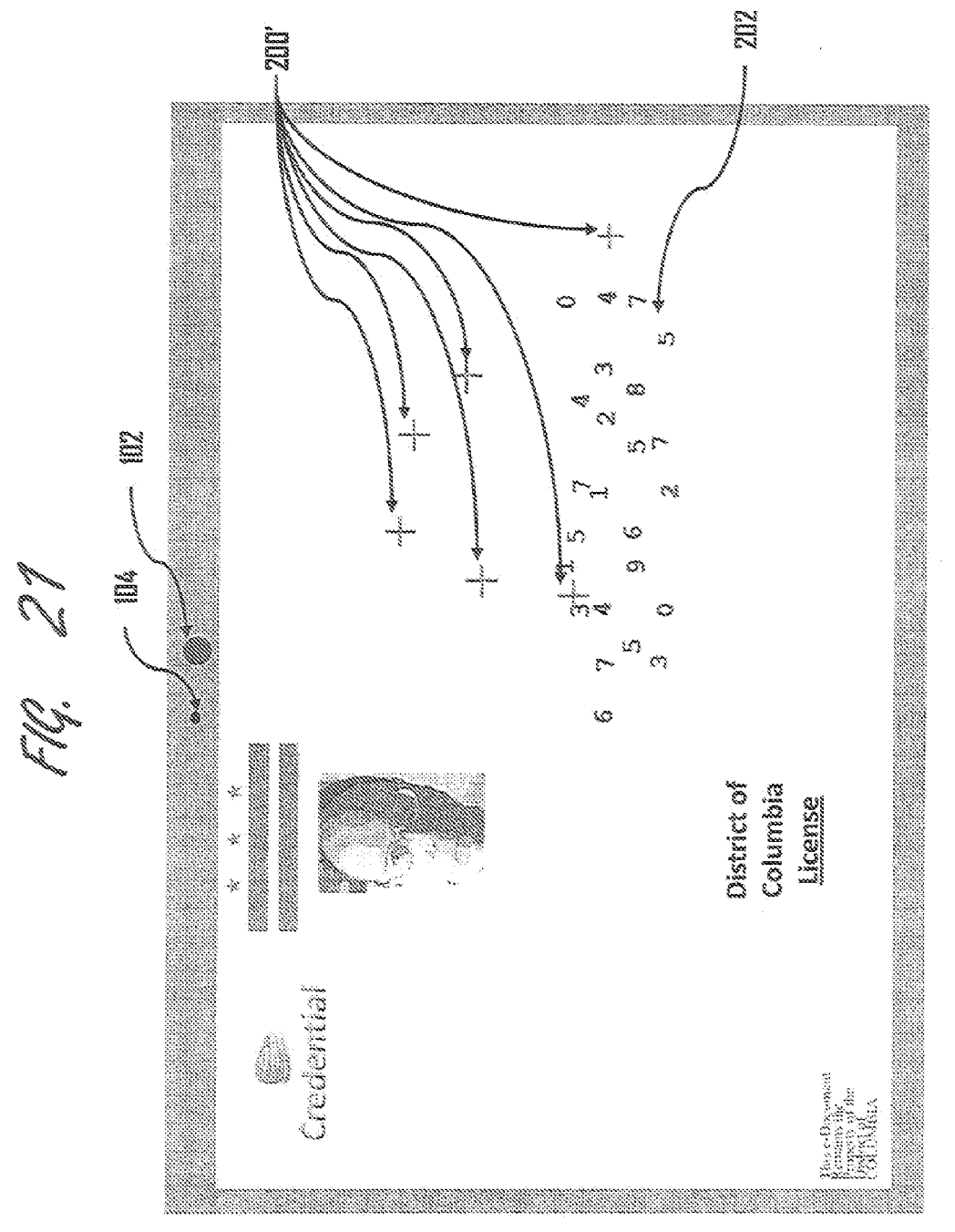
Figure 22:
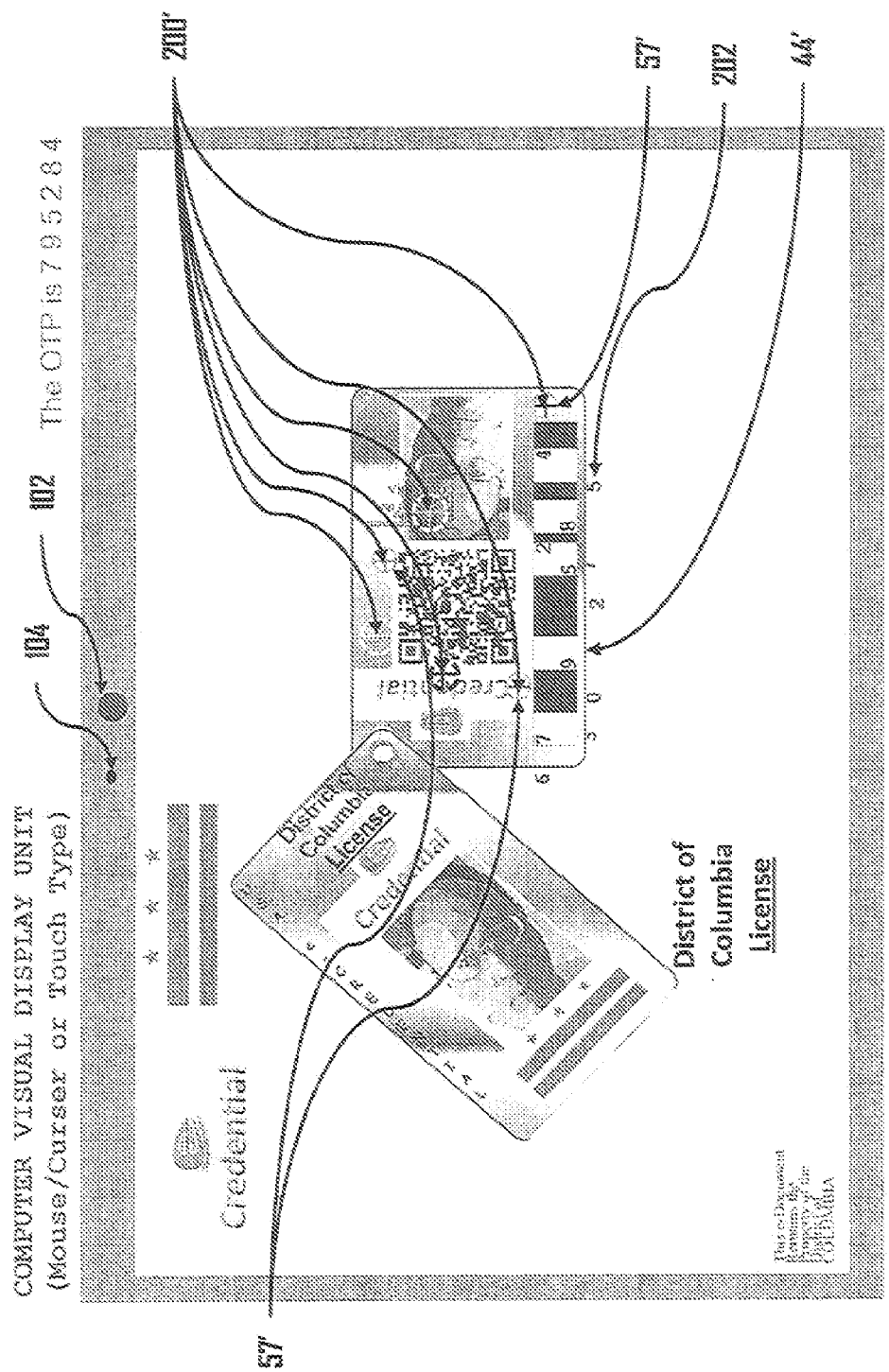
FIG. 22 is a view of the display of FIG. 19 at a fourth stage of a secure transaction aided by the document of FIG. 3 or FIG. 2, 4, 6 or 7.

In FIG. 21, the display shows a matrix of numbers which also could be alpha numeric characters 202 which includes the confirmation code characters. In FIG. 22, the card II 44' is placed against the screen with the indexing apertures 57' aligned with indexing elements 200 so that the mask 56' displays only the characters of the number matrix 202 making up the confirmation code, in this example, the numbers 795284. As noted earlier, the characters can appear in any area of the mask 56' windows and, more than one character can appear in a window.

FIG. 23, including FIGS. 23A, 23B and 23C illustrate a similar transaction using a smart cellular phone such as previously described which includes a camera and a fingerprint reader. In FIG. 23A, a transaction is started by contacting a web site which transmits the caricature image 52' of the user and an image of a digital matrix 64'. If the caricature 52' is dragged and dropped over the matrix 64', the camera 134 takes an image of the user and transmits it back to the website. If the user is verified, a new image is transmitted as shown in FIG. 23B.

The new image includes a virtual card 204 which includes a caricature 52', indexing apertures 206 and a virtual mask 208 with individual windows 210. Also present are indexing elements 200' and a confirmation matrix 202'. The virtual card 204 can be positioned so that the indexing apertures 206 align with the indexing elements 200'. This places the characters constituting the confirmation code into the windows 210 of the virtual mask 208 as seen in FIG. 23C.

By moving the virtual card 204, a partially obscured photo image 212 of the user is revealed. As before, the confirmation code, here 795284 is selected with a stylus and a transmit key on the phone is accessed, transmitting the information back to the web site. As before, a photo may be taken to maintain a record of the user of the phone at the time the transaction was consummated.

Considering the safety and security of transactions using the concepts of the present invention, whether with real or virtual documents, yet additional applications have been made possible. A user controlled "virtual wallet" or "purse" in which several different entities' virtual cards can be securely kept collectively and used only when the rightful owner chooses. This aspect takes on particular importance should the device holding the cards be lost or stolen. "Virtual" credit or other entity cards, in addition other user credentials, may be created as secure files and subfiles in a remote server accessible securely through the internet by their own user or individual owner being able to effect the creation of a personal virtual card with its own unique encryption/decryption trusted key exchange for the user's personal use, Such virtual accessible documents could be a birth certificate, marriage certificate, deeds to property, and any other valuable document whose presentation may be required.

Such a key exchange may involve the use of multiple encrypted and re-encrypted session key exchanges and which may be triple or more times key transfer sequences to ensure system integrity throughout all transactions. At least one of the keys used may be biometrically based, being derived from the user's biometrics.

These security steps are taken in order to facilitate an evidentiary chain of accountability for later use should that be necessary in a legal proceeding. Contacting the server and establishing identity through the use of a smart phone with fingerprint scan capabilities and a camera can retrieve an identity verification document.

As shown in FIG. 24, which includes FIGS. 24A, 24B, 24C and 24D, the various steps in such a transaction are illustrated. A "smart" cellular telephone 130 with touch screen 132, such as is shown in FIG. 11, is employed in the present example. A camera 134 and a fingerprint reader 136 provide biometric verification as the identity of the user is confirmed. An opening display for the process can include a caricature 30' and a digital matrix 32'. In the embodiment, the process is begun by dragging the caricature 30' over the digital matrix 32' which transmits a signal to provide the next screen as shown in FIG. 24B, as well as taking a picture & or an iris image of the phone user via camera 134. Alternatively, a finger scan 135 or a voiceprint from microphone 133 may be used alone or in any combination.

In FIG. 24B, a confirmation matrix 202' is displayed and supplies the necessary confirmation characters to the virtual card 204' which has indexing apertures 206' and a mask 208' with which to view the confirmation code which is a onetime PIN. The code characters are revealed when the indexing apertures 206' are superimposed over the indexing elements 200'. The clear windows in the mask 208' display the confirmation code characters, here the number 795284. As in the other examples, the confirmation code characters are selected with manual touch or with a stylus and the information is transmitted with, if desired, the photo of the user.

The server or onboard processor acknowledges receipt of correct confirmation code input supported by biometric evidence by displaying, if correctly entered, the virtual "wallet". If confirmed, the "wallet's" clasp 207 will open as shown. The virtual wallet can now be dragged open or for privacy may be dragged closed or opened again without locking it at any time. FIG. 24D, shows an open virtual wallet 214 together with a caricature 30' and a digital matrix 32'. The user can then select a virtual credit card or other virtual document contained within the wallet 214 to enable a subsequent secure transaction.

At the conclusion of the owner's use, the virtual wallet 214 is dragged closed and the clasp 207 double tapped or clicked to lock it, at which time another photograph may be taken to memorialize the action. The visual impact of the easily visible clasp position, indicating the security or accessibility of the virtual cards contained therein, is a safety feature that cannot be underestimated, particularly for individuals that may be, in part, visually impaired. Of course all functions that are satisfactorily accomplished may be accompanied by function distinctive vibrations and sounds.

All transactions for the user's audit benefit can be date time stamped and encrypted within all records that the user chooses to maintain. However, the virtual cards provided by entities other than the virtual wallet owner are not accessible unless the entity provides that authority within the foregoing described process.

Figure 26:
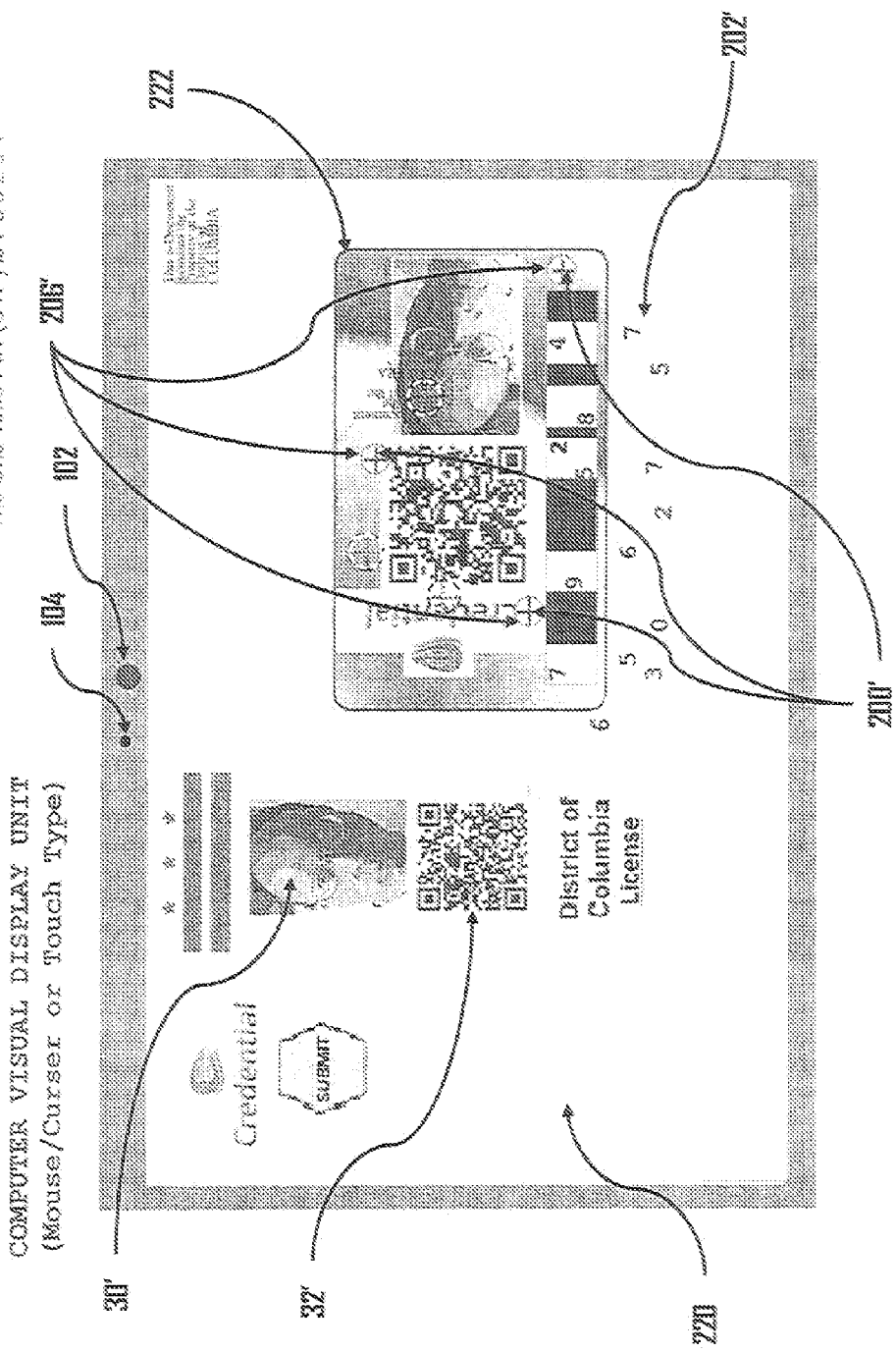
FIG. 26 is a view of the display of FIG. 25 at a later stage of a secure transaction.

Turning next to FIGS. 25 and 26, they illustrate a secure transaction using a computer display 220 and a virtual card. The computer display 220 is preferably a touch screen. In FIG. 25, there s shown on the display 220 an image 222 of a document substantially similar to the virtual card 204 of FIG. 24 which is to be used in substantially the same way. Also shown on the display 220 is a caricature 30' and a digital matrix 32'. For this phase of the transaction, indexing elements 200' are also displayed.

In FIG. 26, a confirmation matrix 202' is displayed and, when covered by the mask portion of the virtual card image 222, reveals a confirmation code when indexing apertures 206' are aligned with indexing elements 200'. In this example, the confirmation code is 79584.

As with the other examples, the code can be entered by touching the display 220 at those numbers. The transaction can be completed with the provision of a virtual "submit" button on the display 220 or by any other predetermined combination of image movement or manual activation of the display 220.

Turning now to FIGS. 27A, 27B and 27C. there is shown sequenced actions 2700 progressing from left to right, to create a password type access sequence to an operating system or application that can be accredited with operator verified status. This sequence is designed to be input on a touch sensitive or similar display unit such as a smart phone or tablet PC, but can also be used with a traditional type mouse controller for a device without touch sensitive or other gesture detecting capabilities.

In FIG. 27A, there is shown a virtual masking screen template 2701, which is size adjustable by the operator. The process begins in the active screen area 2702 using for this process. preformatted color sphere matrices 2704, 2406, 2408 in various color spectrums which are selectable by the operator to suit its own color acuity. A custom formatted matrix 2710 is operator created. The selected matrix 2704 is depicted within the template being four by six colored spheres as an example but may be more or less in number. The operator can select the number of points (indexing elements) 2712 required for the access sequence, from a minimum of two but potentially to 16 or more. Here, the operator has selected five (5) indexing elements 2714 for the matrix. Within the template 2701, the operator selects the locations 2715 of the five indexing elements. On the selection of the final element, the color spheres are concealed.

In FIG. 27B, from the available size templates 2716, the operator selects the size for the five indexing elements or targets of the desired matrix choosing the next to the largest sized active indexing element 2718 from a choice ranging from a size equal to full sized color sphere to a reduced size target. Selecting the larger size provides simpler input but with a lower entropic value. Selecting the smallest target size requires greater accuracy with a more challenging input and a higher entropic value. The operator next selects the input order 2720 of the indexing elements. This can be all indexing elements or a reduced set to allow for drag and drop functionality of any or all of the elements. As shown is four indexing elements have been selected.

In FIG. 27C, the operator has elected to use drag and drop functionality 2724 for the final two indexing points, from location 2728 to location 2730. A menu 2722, containing preformatted and customizable templates 2726 for drag and drop functionality. The operator has selected option 2724 from the menu and must then identify the starting point 2728 and end point 2730. Once the start and end points of the gesture are identified, the operator must then perform that function on the screen 2725.

In FIG. 28A, the five selected colored spheres become visible at the selected indexing locations 2802, 2804, 2806, 2808 and 2810. The operator confirms the input sequence 2812 using the colored spheres, including drag and drop function. In FIG. 28B, an additional security measure can be implemented in the form of sequential cadence, being the speed, length of contact, gesture and pause between each indexing location. Additionally, the operator may elect to use each location more than once for this feature. A display 2814 of the operator's entered cadence uses identifying characters to represent the relative colored spheres where "A" represents location 2802, "B" represents location 2804, "C" represents location 2806, "D" represents location 2808 and "E" represents location 2810. The length of time both in contact and pause can be seen, including a long solid contact for the drag and drop action between location C and location E. In this example the operator has entered location 2802 once, location 2804 four times in quick succession, location 2806 once, location 2808 once, then utilized drag and drop between location 2806 and location 2810 and a final 'tap' or 'click' at location 2810. To complete setup, the operator must then confirm the sequence in FIG. 28B by repeating the input sequence correctly. Upon successful completion, the device, operating system or application will be unlocked as depicted in FIG. 28C.

In FIG. 28C a group of application icons 2816 are displayed, unlocked by the foregoing described login sequence. Two applications require additional security for access, a Virtual Wallet application icon 2818 for financial cards and transactions and a Virtual Vault application icon 2820 for secure documents such as Marriage or Birth Certificates, Passports or Visa documents and the like. These applications can only be unlocked with any user controlled input sequence as previously described, being simpler or more complex as desired. For any of these proposed uses, any or all of the outlined features or options can be used independently or together at the operator's and/or operating system/application manager's discretion. A sector 2822 is a shortcut to instantly lock the device, pausing any transactions and saving the device's state prior to locking. This is independent of the device's shutdown. Other security features for compatible devices could be the ability to invert a handheld device or set a physical shortcut button or an emergency alert tap sequence that when entered may in addition to the foregoing initiate a covert background alert, contact or record or activate a camera or location function.

Turning next to FIGS. 29A, 29B, 29C, 29D and 29E, a series of screens 2700' are shown which illustrate and extend the functionality described in FIGS. 27 and 28. A menu 2902 contains a selection of stock images or the option to select from the user's own images an alternative background to the colored spheres described in FIG. 27. This option allows the operator to select images that suit personal color spectrum acuity and to utilize memory prompts from the selected image which the operator may insert or modify in order to recognize and select it specifically if presented as a choice between it and the original image.

For an example, the operator selects an image 2904 from the available menu 2902 which now includes the operator modifications to uniquely differentiate it to the operator from the original image to appear on the screen 2906 of the device. FIG. 29B to FIG. 29E follow the same process as previously described for the colored spheres of FIGS. 27A, 27B, 27C and FIGS. 28A, 28B, 28C with the only difference being a operator selected and preferably operator modified image in order to assist in the ability to recognize and select it specifically if presented as a choice between it and the original image at a later time as the background image in the place of the spheres. An image may be used by an operator to either facilitate a more complex input sequence or to simplify the process by using memory jogs of the picture as opposed to colored spheres.

Turning to FIG. 30A, being an extension of the functionality described in FIGS. 27, 28 and 29, there is shown a series of screens 2700" A menu 2902' contains a selection of stock images or the option to select from the user's own images, an alternative background to the colored spheres described in FIG. 27. This option allows the operator to utilize personalized memory prompts from the selected image. For this example, the operator has selected an image 2904' from the available menu 2902' which is a cartoon that will now appear on the screen 3002 of the device. The option of an operator selected cartoon or image also allows the potential to add custom elements to the image through a modification menu (not depicted). This would be a further aid for memory retention of complex custom designed gestures resulting in an access sequence password with an extremely high entropic value while retaining operator simplicity and speed of use.

The operator's selected indexing elements 3004, as described in FIGS. 27A and 27B are shown here. The indexing elements are represented as triangles rather than crosshairs, as they are more suited to a picture background. The operator can select the size of the indexing elements from a menu 2716', similar to that described in FIG. 27B. As the indexing elements are placed in selected locations 3006 and are displayed on the screen, the triangle shaped indexing elements 3004 are hidden, revealing the image locations which the operator has selected. In this example the operator has chosen index location points represented by sections of tree, a bird in the sky and the door handle of the depicted car. A gesture menu 2722' allows the operator to create a custom gesture sequence with a start point 2728' and an end point 2730' for the custom gesture on the screen. The menu 2722' can then provide visual, audible and/or haptic feedback, according to operator's settings as confirmation.

The operator selects a custom gesture 3008 from a menu 2722', which could be performed on the touch sensitive screen of a device by gesture or by another pointing device. The menu can then provide visual, audible and/or haptic feedback according to operator's settings as confirmation.

In FIG. 30B, the selected custom gesture 3008 is depicted in the preloaded templates of gesture menu 2722' of FIG. 30B. Once the operator confirms the gesture is correct, it is now stored in this location permanently and available for future use as shown in the third screen of FIG. 30A. The cadence menu 2814' of FIG. 28B, in this instance, has not been elected for use by the operator. A confirmation of the access sequence must then completed to finalize setup before the device can be unlocked as detailed at FIG. 28C.

Turning to FIG. 31A, the process of unlocking a secure application in the device, having already successfully entered the access sequence password for the device and its operating system is depicted. The device 3012' is shown in an unlocked state. Depicted on the screen are a number of applications icons as explained in FIG. 28C. The application represented by icon 3112 is locked irrespective of the unlocked state of the device, this application being the Virtual Vault, as detailed in FIG. 28C.

FIG. 31B depicts the login or access screen which is invoked to open the application. This screen is accessed by selecting icon 3102 in FIG. 31A. A series 3104 of personally selected colored spheres as outlined in FIG. 27 is displayed. In this instance the operator has previously established an access sequence password for the application and one must input this sequence to unlock the application. As with the device operating system, all, some or only one aspect of the access sequence setup need be adopted as the operator deems appropriate for requirements.

In FIG. 31C, the Virtual Vault application is shown unlocked with a series of options on the screen. A simple instruction to select a document is shown as a command 3106 on the screen. A shortcut 3108 is displayed, which, when accessed, quickly secures the Vault if the operator is disturbed whilst accessing a potentially secure document. A filing cabinet icon 3110, when selected, will open a gallery of the contained documents, which could include but is not be limited to Driver's Licenses, Birth Certificates, Marriage Certificates, Passports or Visa documents.

Referring back to FIG. 31A, there is a similar locked icon 3112 for a Virtual Wallet application which, when accessed would permit use of stored financial documents which could permit credit or debit card transactions or permit banking or similar transactions. The access sequence password could be the same as that for the Virtual Vault or another independent completely different password. As before, all, some or only one aspect of the access sequence setup need be adopted as the operator deems suitable for its requirements.

In FIGS. 32A and 32B, an alternative embodiment of a Multiface Document is shown. There is shown the Obverse Surface 3202 of Card I and the Reverse Surface 3204 of Card II. A grommet 11' holds Cards I and II together securely but preserving the ability of the cards to rotate about the grommet 11'.

For added security, an identifiable sealing grommet 3224 can be combined with or can modify the grommet 11'.

A Public Key Infrastructure (PKI) cryptographic key 3206 is shown as a two dimensional barcode or matrix form which has been issued by an entity with which the holder has a relationship. This PKI is machine readable in order to effect secure transactions or communication between the individual and the issuing entity. In this reading process the 2D barcode or matrix would appear on the utilized device's display. A Near Field Communication (NFC) RF chip 3208 is included to effect transactions by the individual and the issuing entity. On the reverse surface 3204 of card II there is provided either a conventional read-only or reprogrammable magnetic stripe 3210 with onboard processor capabilities, allowing it to reprogram itself after each use. Each type of magnetic stripe 3210 is vulnerable to damage and both contain sensitive data related to the holder if copied and accordingly been placed on the protected reverse face of card II. An internal faraday cage 3212 is inserted to the rear or closest to the obverse card surfaces to protect the NFC chip 3208 and the circuitry of the magnetic stripe at 3210 from being compromised by unauthorized access.

In FIG. 32B there is shown the Reverse Surface 3214 of Card I and the Obverse Surface 3216 of Card II. Also shown is the grommet 11' and the identifiable sealing grommet 3224. A second Public Key Infrastructure (PKI) cryptographic key 3218 in two dimensional barcode or matrix form issued by an entity with which the holder has a relationship. This PKI two dimensional barcode or matrix is machine readable in order to effect secure transactions or communication between the individual and the issuing entity. In this reading process the 2D barcode would appear on the utilized device's display.

A second Near Field Communication (NFC) RF chip 3220 to effect transactions by the individual and the issuing entity is placed in card I. Also on the reverse face of card I is a second either a conventional read-only or reprogrammable magnetic stripe 3222 with onboard processor capabilities allowing it to reprogram itself after each use. Each type of magnetic stripe is vulnerable to damage and has accordingly been placed on the protected reverse face. An internal faraday cage 3212' component is placed closest to the external or obverse surface to protect the second NFC 3220 and the circuitry of the magnetic stripe 3222 from being compromised by unauthorized access. Due to the location of the NFC chips 3208 and 3220, a partial opening of the Multiface Document is possible, meaning only the desired NFC is unprotected by the faraday cage at any one time during use.

Such a document does not need to incorporate all of the depicted features, and could also include other features as required by an issuing entity in order to be used retrospectively with legacy equipment. Furthermore, such a document could be used in a tamper evident delivery environment function to issue both Public and Private Key data in a cryptographic environment that, for example, uses a Public Key Infrastructure between individuals or an individual and an issuing entity or to effect the confidential exchange of other symmetric/asymmetric key issues in order to effect trusted digital signatures between parties in lieu of delivery by, for example, diplomatic exchange.

Referring now to FIGS. 32C and 32D, there is shown a mini-sized Multiface Document for convenient carriage or concealed operation. A miniature form 3226 of the cards of FIG. 32A, is shown, in this instance, lacking a magnetic stripe. Similarly, a miniature form 3228 of the cars of FIG. 32B, is shown also lacking a magnetic stripe. This card is intended to be used in like manner as FIGS. 32A and 32B, and may be carried on a key-ring or as a fob.

Turning now to FIGS. 33A, 33B, and 33C. there are shown alternative barcode or matrices. For example, in FIG. 33A, the reverse surface of Multiface Document 3204' (similar to that shown in FIG. 32A), includes 2D Barcode or matrix 3206' which may include a PKI Key in addition to other sensitive information.

FIG. 33B, shows a 2D Barcode or matrix 3206', but indicates the four positioning markers 3304. A mask 3306 can be placed on a lamina that is positioned over the bar code to obscure the barcode on the screen of the operator's device scanning the code. The code itself is obscured to prevent it being scanned or copied by a possible third party either by covert device or screenshot.

At FIG. 33C, the obscured code 3308 is depicted on the screen of a "smart device" 3318, such as a mobile phone or tablet or pc which has been preloaded with the obscuring template as part of the application that reads the barcode. This would obviate the necessity of an obscuring lamina At FIG. 33A, another form of barcode or matrix 3310 is depicted as an example of other types of matrices, all of which are or could be used in like manner. In FIG. 33B, a series of indexing lines or positioning markers 3312 are shown, similar to the positioning markers 3304, but in a different form.

The generated mask 3314 for this type of barcode or matrix 3310, when displayed on the screen of the operator's device scanning the code obscures the code itself to prevent it being scanned or copied by a possible third party either by covert device or screenshot. In FIG. 33C, the obscured code 3316 is shown on the screen of a "smart" device 3318, such as a mobile phone or tablet pc which has been preloaded with the obscuring template as part of the application that reads the barcode.

FIGS. 34A and 34B show yet another alternative Multiface Document similar to that shown in FIG. 1. In this embodiment, there is included a transparent document 3402 containing a visible faraday cage which is interleaved between the reverse surface of Document I and the reverse surface of Document II. This is done to protect the contained RF responsive ICCs, NFCs or RFIDs or any readable surfaces contained on or in Document I or Document II. This transparent portion may also include indexing capabilities as a substantially clear document which will have little or no effect on a visual display screen or device, particularly if the display is of a touch sensitive type. An NFC 3404 or other contactless chip on reverse face of document II is protected by an embedded Faraday cage 3408 between it and obverse face of document II. The chip's 3404 location 3406 is shown in dashed lines on the obverse surface of Document II, concealed beneath an embedded faraday cage 3408 Should a chip be embedded in Document I in addition to Document II, an identical, embedded faraday cage would be specified in each.

Yet another embodiment of the multiface document is shown in FIGS. 35A,B and C, wherein there are two obverse and two reverse surfaces, but affixed in a fashion that it is intended to be used as a single document. The reverse surfaces of the document are only accessible to authorized parties which could include technicians of the issuing body of the document. Further, should the reverse surfaces be exposed by unauthorized parties, security features will ensure that the tampering is evident and the card becomes unusable. These security features can include light sensitive inks and interdependent circuitry and in construction would preferably be laid down starting with the reverse surface as each documents base and built up from there where metallic ink/paint may be used or metal deposition to create the internal structure.

Obverse Face I and Reverse Face I of the document could potentially be issued by one entity and Obverse Face II and Reverse Face II by a second entity who by agreement intend the functions to be utilized as a co-joined multiface document. Both documents could also be issued by the same entity, for example, to access two or more different services or provide increased functionality over a traditional dualface document. The Obverse 3502 of Document I includes all of the features that would traditionally be included on the two surfaces of a standard dual face document. These include an image of the bearer 3504, NFC logo 3510, a magnetic stripe 3518, a 2D barcode 3408 and NFC or RF chip and its transmitting antenna 3514. A predetermined non-faraday cage protected area 3506 is provided in order that the NFC or RF chip on Reverse II 3552 may be read through Obverse I 3502.

A faraday cage 3512 is embedded between Obverse I 3502 and Reverse I 3520 and above the containing layer 3526 of electronic circuitry. A concentrated faraday cage screen 3516 is placed above the RF chip and its antenna 3514. Apertures 3524 at points on Reverse I allow unimpeded RF communication through these points only. Circuitry 3526 is laid down by metal ink or deposition applied to surface 3520 to create metal structures. A combined Obverse Reverse of Document I 3530 displays all functions and circuitry from both Faces of the Document.

FIG. 35B shows, in this example, a document identical to that displayed in FIG. 35A, but designed to work in concert with Document I when co-joined. FIG. 35C depicts the two Documents being co-joined by Reverse I and Reverse II. The co joining may incorporate an invisible hinge 41. as depicted in FIG. 2, The invisible hinge 42 can also facilitate communication and, if necessary, be a power link between Document I and Document II. The finished Multiface Document will have the same dimensions including depth as a conventional financial institution dual face documents, allowing compatible use with all existing technology and functions.

Thus there has been disclosed a novel document having a plurality of sides, most of which are normally concealed. The document includes features that are images that are sufficiently degraded so as to defeat facial recognition equipment yet not so degraded as to prevent a human observer to confirm that the image is that of a legitimate bearer of the document. Real images of the bearer on the concealed side are strategically covered with a non transparent official seal that obstructs enough of the image to substantially defeat face recognition techniques but sufficiently exposed to facilitate human confirmation of the holder.

Other features include masks that can be used with displays to select authorization or confirmation code characters from a matrix of characters. The documents can also include magnetic strips and other types of machine readable lines of text which can store information about the person with whom the document is associated and information strips containing data susceptible to optical scanning.

The document can have embedded an RFID processor circuit or a plurality of RFID processor circuits, any one or all of which can be interrogated and, alternatively, the RFID processor circuit can be made operable or inoperable by the bearer.

Moreover, the document need not be a physical document but can exist as a virtual document which possesses the features of the real document and which can be used in a similar fashion in conjunction with computer or other machine displays or with smart cellular telephones or the like. The telephones and displays can have, associated with them, cameras, fingerprint scanners, thermographic infrared sensors and other devices capable of acquiring biometric information about the authorized bearer as well as reading high density data images from other documents in both real and virtual displays.

All of the foregoing embodiments may utilize computer, smart phone or the like with specific applications that, during the loading sequence, will incorporate the identification data of the device, including its display size and features such as touch sensitive, as well as that of the authorized user or users should there be more than one. This facilitates specific verification and or authentication sequences that will facilitate speedy transactions between different computer-smart phone or the like combinations.

All of the techniques taught or described herein preferably utilize a four factio test when enabling access to secured data. Such a test is defined by the presence of the following elements:
1. Something one has—a device;
2. Something one recognizes—a self formatted and colored spheres or a self modified image or cartoon;
3. Something one knows—a selected sequence of entry locations; and
4. Something one can do or perform—the rhythm and consistent timing of a complete data entry sequence.

The above also requires simplicity and memory prompts achieved by the individual's own modification of a presented image and the ability to select it from other similar images Further, each specific application embodying this feature will be enabled in such a way as to facilitate its remote decommissioning should it be lost or stolen. Additionally under such circumstances, the specific application that has been decommissioned may be capable of operation in a "stolen" mode to self report its location via inbuilt GPS functionality as well as gathering biometric data from any attempted uses for evidentiary use in any subsequent legal action.

Yet another disclosure is an ATM machine that does not need a card transport and security reading mechanism or a keyboard despite its illustrated presence in FIGS. 13 and 14. Such an ATM can operate in conjunction with a touch screen or the like in conjunction with virtual card transactions being instigated or completed via mobile smart phone in all aspects except the confirmed cash dispensing function which can be enabled by an appropriate image on a handheld device. This will save substantial time in front of an ATM, freeing it up for other users in high volume areas. All of the foregoing ATM features and the physical machine as well as users being under direct integrated counter surveillance cameras can proactively detect unlawful acts and record encrypted evidence of the same under any lighting condition.

Other embodiments and techniques within the scope of the invention will manifest themselves to those skilled in the art. Therefore, the scope of the invention should only be limited by the claims appended hereto.

The invention claimed is:

1. A machine-implemented method for authenticating a user session, comprising the steps of:
    displaying a selected digital image on a display screen;
    receiving a user drawing template executed by a user over said selected digital image;
    associating a user drawing template member with a user position template; and
    determining if the user drawing template member and the digital image match in part and if a user position selection corresponds to said user position template for authenticating access to the user session when the user position selection substantially duplicates said user position template.

2. The method of claim 1, further comprising the step of:
    tracing the user position template over the drawing template and selected digital image.

3. The method of claim 1, wherein the user drawing template includes at least one of a user touch point, a user curve gesture, a user line gesture, and a user freestyle form gesture.

4. The method of claim 1, further comprising the step of:
    associating a drawing template member with a set of timing data indicating at least one of duration of entry and speed of entry.

5. A machine implemented method for authenticating a user to the machine comprising the steps of:
    selecting a first visual display from stored displays in the machine;
    selecting a predetermined portion of said display;
    selecting and storing in the machine gestures designating destination points of said predetermined portion to create a routine to gain access to restricted data stored in the machine;
    subsequently selecting said first visual display and said predetermined portion;
    carrying out said routine on said predetermined portion; and
    granting access to restricted data if said subsequent series of gestures entered is substantially identical to said stored routine and denying access if the subsequently entered routine is not substantially identical to said stored routine.

6. The method of claim 5 wherein said routine includes a cadence determining the time to complete each gesture.

7. The method of claim 5 wherein said routine includes a repetition pattern for each gesture in said routine.

8. A machine implemented method for authenticating a user to the machine comprising the steps of:
    selecting a first visual display from stored displays in the machine;

creating a template with an aperture to mask a predetermined portion of said display to reveal less than all of said predetermined portion;

selecting and storing in the machine gestures designating destination points of said revealed elements of said predetermined portion to create a routine to gain access to restricted data stored in the machine;

subsequently selecting said first visual display and masking said predetermined portion to reveal the same portion previously selected;

carrying out said routine on said revealed part of said predetermined portion; and granting access to restricted data if said subsequent series of gestures entered is substantially identical to said stored routine and denying access if the subsequently entered routine is not substantially identical to said stored routine.

9. The method of claim 8 wherein said routine includes a cadence determining the time to complete each gesture.

10. The method of claim 8 wherein said routine includes a repetition pattern for each gesture in said routine.

* * * * *